(12) United States Patent
Suh

(10) Patent No.: US 12,507,057 B2
(45) Date of Patent: Dec. 23, 2025

(54) COMMUNICATION FOR ROAMING TERMINAL IN WIRELESS COMMUNICATION SYSTEM

(71) Applicant: Samsung Electronics Co., Ltd., Gyeonggi-do (KR)

(72) Inventor: Kyungjoo Suh, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 403 days.

(21) Appl. No.: 18/107,213

(22) Filed: Feb. 8, 2023

(65) Prior Publication Data

US 2023/0254679 A1    Aug. 10, 2023

(30) Foreign Application Priority Data

Feb. 9, 2022   (KR) .................. 10-2022-0017216
Feb. 10, 2022  (KR) .................. 10-2022-0017824

(51) Int. Cl.
*H04W 8/06*   (2009.01)
*H04W 84/04*  (2009.01)

(52) U.S. Cl.
CPC ............ *H04W 8/06* (2013.01); *H04W 84/042* (2013.01)

(58) Field of Classification Search
CPC ....... H04W 8/06; H04W 84/042; H04W 8/02; H04W 8/12; H04W 60/00; H04W 60/04
See application file for complete search history.

(56) References Cited

U.S. PATENT DOCUMENTS

| | | | | |
|---|---|---|---|---|
| 12,010,611 | B2 * | 6/2024 | Prakasam | H04W 8/205 |
| 2010/0197268 | A1 * | 8/2010 | Raleigh | H04M 15/41 |
| | | | | 455/432.1 |
| 2019/0182655 | A1 * | 6/2019 | Gupta | H04W 12/102 |
| 2019/0253917 | A1 * | 8/2019 | Dao | H04W 76/27 |
| 2022/0132455 | A1 * | 4/2022 | Gupta | H04W 76/11 |
| 2022/0312182 | A1 * | 9/2022 | Venkataraman | H04W 48/16 |
| 2023/0171598 | A1 * | 6/2023 | Normann | H04W 8/18 |
| | | | | 455/410 |
| 2023/0300674 | A1 * | 9/2023 | Kedalagudde | H04W 24/10 |
| | | | | 370/230.1 |
| 2023/0422142 | A1 * | 12/2023 | Vakeesar | H04W 40/20 |

(Continued)

OTHER PUBLICATIONS

3GPP TSG-SA WG2 Mtg Huawei Kochi India Jan. 2019 Procedures for Inter-RAT mobility support to and from NB-IOT. (Year: 2019).*

(Continued)

*Primary Examiner* — Yuwen Pan
*Assistant Examiner* — Swati Jain
(74) *Attorney, Agent, or Firm* — The Farrell Law Firm, P.C.

(57) ABSTRACT

The disclosure relates to a 5G or 6G communication system for supporting higher data rates. A method performed by a UE includes transmitting, to a first VPLMN, a first registration request message; receiving, from the first VPLMN, a registration accept message including roaming information associated with an HPLMN; validating the roaming information; based on a result of the validating, setting a timer for releasing a PDU session with the first VPLMN; based on the timer, performing a local release for the PDU session with the first VPLMN; based on the roaming information, selecting a second VPLMN; and transmitting, to the second VPLMN, a second registration request message.

14 Claims, 11 Drawing Sheets

(56) References Cited

U.S. PATENT DOCUMENTS

2025/0113216 A1* 4/2025 Foti .................. H04W 60/00

OTHER PUBLICATIONS

3GPP TSG WG Mtg Apple Aug. 2020 UE to always send Registration Complete at the end of registration procedure (Year: 2020).*
Ericsson, "V-SMF Change at Inter-PLMN Mobility", S2-2109073, 3GPP TSG SA WG2 Meeting #148E, Nov. 15-22, 2021, 24 pages (Year: 2021).*
Huawei, "Procedures for Inter-RAT Mobility Support to and from NB-IoT", 82-1900630, 3GPP TSG-SA WG2Meeting #130, Jan. 21-25, 2019, 49 pages (Year: 2019).*
Apple, "UE to Always Send Registration Complete at the End of Registration Procedure", C1•204995, 3GPP TSG-CT WG1 Meeting #125-e, Aug. 20-28, 2020, 7 pages (Year: 2020).*
Nokia, Nokia Shanghai Bell, "Update of Steering of Roaming Information for Different Registration Types", 52-2002206, 3GPP SA WG2 Meeting #137E, Feb. 24-27, 2020, 12 pages (Year: 2020).*
Apple, "UE to Always Send Registration Complete at the End of Registration Procedure", C1-204995, 3GPP TSG-CT WG1 Meeting #125-e, Aug. 20-28, 2020, 7 pages.
Huawei, "Procedures for Inter-RAT Mobility Support to and from NB-IoT" S2-1900630, 3GPP TSG-SA WG2Meeting #130, Jan. 21-25, 2019, 49 pages.
Ericsson, "V-SMF Change at Inter-PLMN Mobility", S2-2109073, 3GPP TSG SA WG2 Meeting #148E, Nov. 15-22, 2021, 24 pages.
Nokia, Nokia Shanghai Bell, "Update of Steering of Roaming Information for Different Registration Types", S2-2002206, 3GPP SA WG2 Meeting #137E, Feb. 24-27, 2020, 12 pages.
International Search Report dated May 1, 2023 issued in counterpart application No. PCT/KR2023/001794, 7 pages.

* cited by examiner

COMMUNICATION FOR ROAMING TERMINAL IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2022-0017216 and 10-2022-0017824, which were filed in the Korean Intellectual Property Office on Feb. 9, 2022, and Feb. 10, 2022, respectively, the entire disclosure of each of which is incorporated herein by reference.

BACKGROUND

1. Field

The disclosure relates generally to a device and method for supporting mobility of various terminals in a wireless communication system, and more particularly, to a method for supporting roaming in $5^{th}$ generation (5G) communication.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A 5G system currently being developed requires a method for communicating using a roaming technique, as in previous systems. Roaming or a roaming technique may refer to a technique for enabling a terminal to receive a communication service through another public land mobile network (PLMN) in which the terminal is not registered in the case that the terminal is out of range of a registered PLMN.

A PLMN in which the terminal is not registered is referred to as a visited PLMN (VPLMN), and a PLMN in which the terminal is registered is referred to as a home PLMN (HPLMN). In this case, a method for the terminal to provide an appropriate data communication service in the VPLMN is required. Further, there is required a method of configuring the terminal so that the terminal may select an appropriate VPLMN.

SUMMARY

The disclosure has been made to address at least the above-mentioned problems and/or disadvantages and to provide at least the advantages described below.

An aspect of the disclosure is to provide a method and device for selecting an operator PLMN for a terminal to perform data communication during roaming in a wireless communication system.

Another aspect of the disclosure is to provide a method and device for processing PLMN information, which is to be newly accessed by a terminal and transmitted in a wireless communication system.

Another aspect of the disclosure is to provide a method and device for a terminal to verify PLMN information, upon receiving PLMN information to be newly accessed by a roaming terminal in a wireless communication system.

Another aspect of the disclosure is to provide a method and device for a terminal to perform communication according to a verification result (success/failure) of PLMN information to be newly accessed by the terminal in a wireless communication system.

In accordance with an aspect of the disclosure, a method is provided for a UE in a wireless communication system. The method includes transmitting, to a first VPLMN, a first registration request message; receiving, from the first VPLMN, a registration accept message including roaming information associated with an HPLMN; validating the roaming information; setting a timer for releasing a protocol data unit (PDU) session with the first VPLMN; based on the timer, performing a local release for the PDU session with the first VPLMN; based on the roaming information, selecting a second VPLMN; and transmitting, to the second VPLMN, a second registration request message.

In accordance with an aspect of the disclosure, a method is provided for an access and mobility management function (AMF) associated with a first VPLMN in a wireless communication system. The method includes receiving, from a UE, a registration request message; in response to the registration request message, transmitting, to an HPLMN, a request message; receiving, from the HPLMN, roaming information; transmitting, to the UE, a registration accept message including the roaming information; and receiving, from the UE, a notifying message indicating that the roaming information is not valid.

In accordance with an aspect of the disclosure, a UE is provided for use in a wireless communication system. The UE includes a transceiver; and a controller configured to transmit, to a first VPLMN, a first registration request message, receive, from the first VPLMN, a registration accept message including roaming information associated with an HPLMN, validate the roaming information, set a timer for releasing a PDU session with the first VPLMN, based on the timer, perform a local release for the PDU session with the first VPLMN, based on the roaming information, select a second VPLMN, and transmit, to the second VPLMN, a second registration request message.

In accordance with an aspect of the disclosure, an AMF is provided for use in a wireless communication system. The AMF includes a transceiver; and a controller configured to receive, from a UE, a registration request message, in response to the registration request message, transmit, to an HPLMN, a request message, receive, from the HPLMN, roaming information, transmit, to the UE, a registration accept message including the roaming information, and receive, from the UE, a notifying message indicating that the roaming information is not valid.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
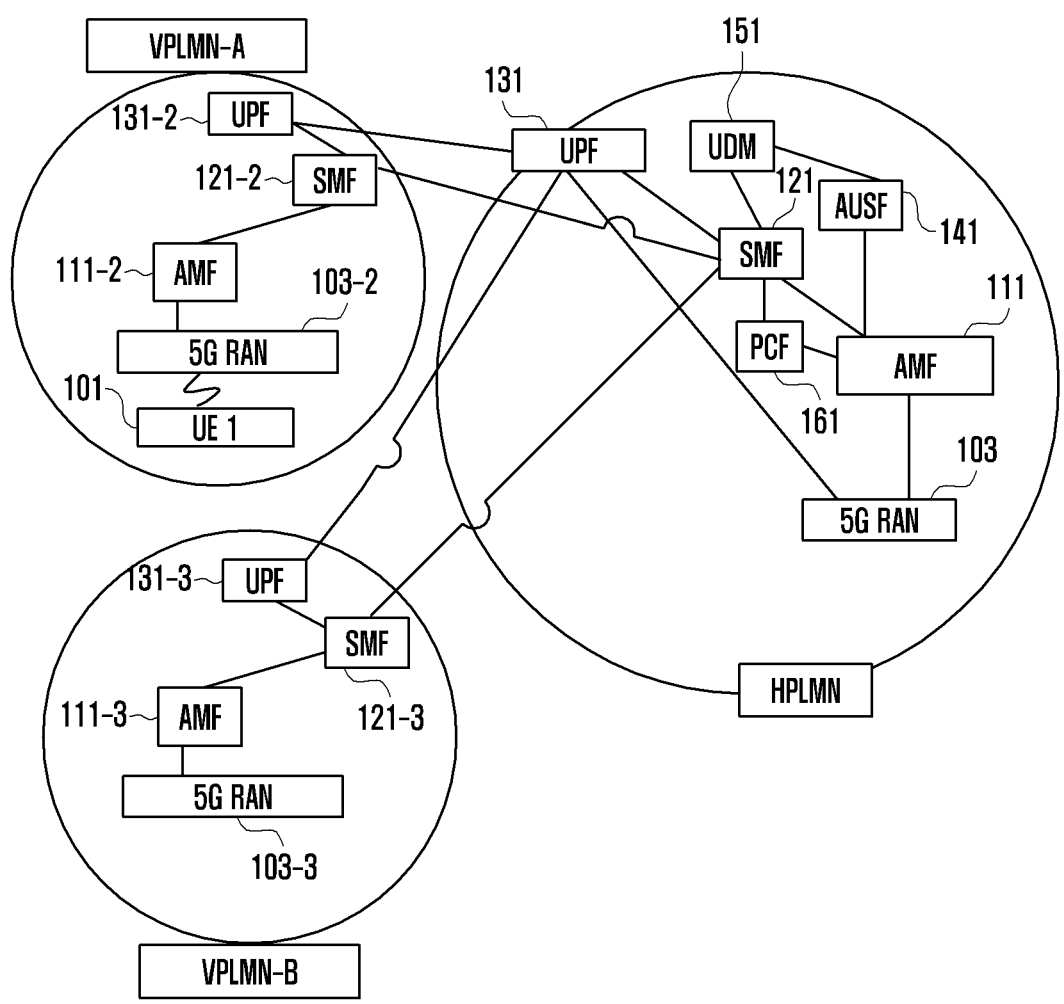
FIG. 1 illustrates a network environment for supporting data communication of a terminal roaming in a 5G network according to an embodiment.

Hereinafter, various embodiments of the disclosure will be described in detail with reference to the accompanying drawings. In describing embodiments, descriptions of technical contents that are well known in the technical field to which the disclosure pertains and that are not directly related to the disclosure will be omitted in order to more clearly convey the embodiments of disclosure without obscuring the disclosure with unnecessary description.

Some components are exaggerated, omitted, or schematically illustrated in the accompanying drawings. As such, the size of each component may not fully reflect the actual size. In each drawing, the same or similar reference numerals may be used for the same or corresponding components.

Various advantages and features of the disclosure, and methods of achieving them will become apparent with reference to the embodiments described below in detail in conjunction with the accompanying drawings. However, the disclosure is not limited to the embodiments disclosed below, but may be implemented in various different forms.

Each block of the message flow diagrams and combinations of the message flow diagrams may be performed by computer program instructions.

Further, each block may represent a module, a segment, or a portion of a code including one or more executable instructions for executing a specified logical function(s). Further, in some alternative implementations, functions recited in the blocks may occur a different order than illustrated. For example, two blocks illustrated one after another may in fact be performed substantially at the same time, or the blocks may be sometimes performed in the reverse order according to the corresponding function.

Herein, the term '-unit' may include software or hardware components such as a field programmable gate array (FPGA) or an application specific integrated circuit (ASIC). A may '-unit' performs a certain role. However, a '-unit' is not limited to software or hardware. A '-unit' may reside in an addressable storage medium or may reproduce one or more processors. For example, a '-unit' may include components such as software components, object-oriented software components, class components, and task components, processes, functions, properties, procedures, subroutines, segments of program code, drivers, firmware, microcode, circuit, data, databases, data structures, tables, arrays, and variables.

Functions provided in components and '-units' may be combined into a smaller number of components and '-units' or may be further separated into additional components and '-units'. Further, components and '-units' may be implemented to reproduce one or more CPUs in a device or secure multimedia card. A '-unit' may include one or more processors.

While various terms are used herein to identify an access node, network entities, messages, an interface between network objects, different identification information, etc., for convenience of description, the disclosure is not limited to these terms, and other terms having equivalent technical meanings may be used.

For convenience of description, embodiments of the disclosure are described below using terms and names defined in the 3rd generation partnership project (3GPP) long term evolution (LTE) standard, or modified terms and names based on this. However, the disclosure is not limited by these terms and names, and may be equally applied to systems conforming to other standards.

In the disclosure, an evolved node B (eNB) may be used interchangeably with a gNB for convenience of description. That is, a base station described as an eNB may also represent a gNB. Herein, the term 'terminal' may refer to mobile phones, node B (NB)-Internet of things (I) devices, sensors, as well as various wireless communication devices.

In describing embodiments of the disclosure, although the 3GPP mainly referenced, the disclosure is also applicable to other communication systems having similar technical backgrounds, as will understood by those of ordinary skill in the technical field of the disclosure.

In accordance with an embodiment, a method for providing a service by a PLMN first selected by a roaming terminal is provided, when an HPLMN attempts to forcibly move the roaming terminal to another PLMN, e.g., for economic reasons such as service improvement or billing.

In accordance with another embodiment, a method for an HPLMN on a control plane to transmit relevant information to a terminal in a VPLMN through non access stratum (NAS) signaling, when the terminal selects an operator PLMN in order to perform data communication in the VPLMN.

In accordance with another embodiment, a method is provided for a terminal to verify PLMN information and to communicate according to the verification result (success/failure), when the PLMN information to be newly accessed is transmitted for the terminal to perform data communication in the a VPLMN.

FIG. 1 illustrates a network environment supporting data communication to a terminal roaming in a 5G network according to an embodiment.

Referring to FIG. 1, a UE 101 is subscribed to an HPLMN 181. VPLMN-A 183 and VPLMN-B 185 are PLMNs that the UE 101 is not subscribed to, but may visit.

Further, in FIG. 1, network functions (NFs) constituting a core network include some components for providing a service according to the selection and change of a VPLMN to a roaming terminal according to the disclosure. Although the 5G core network standard names specific NFs, each NF may be implemented in one specific server, two or more different NFs may be implemented in one server, and one NF may be implemented through two or more servers. Further, a program that performs an NF function may be loaded into a specific server and driven. Herein, there is no particular restriction on how an NF is implemented.

Devices having the same NF name in each of core networks (i.e., HPLMN 181, VPLMN-A 183, and VPLMN-B 185) illustrated in FIG. 1 may all perform the same function. The PLMNs are classified into a HPLMN and a VPLMN according to whether it is a subscribed PLMN or an unsubscribed PLMN from the point of view of the terminal.

5G radio access networks (RANs) 103, 103-2, and 103-3, which serve as base stations in each of HPLMN 181, VPLMN-A 183, and VPLMN-B 185, respectively, may transmit and receive signals to and from terminals through physical channels using radio signals according to 5G communication standards. The 5G RANs 103, 103-2, and 103-3 may transmit and receive signals/messages/data between the UE 101 and the 5G core network.

The HPLMN 181, VPLMN-A 183, and VPLMN-B 185 user plane function (UPF) devices 131, 131-2, and 131-3, session management function (SMF) devices 121, 121-2, and 121-3, and AMF devices 111, 111-2, and 111-3, respectively. Additionally, the HPLMN 181 includes a user data management (UDM) device 151 a policy control function (PCF) device 161, and an authentication server function (AUSF) entity 141. While FIG. 1 only illustrates the HPLMN 181 including the UDM device 151, the PCF device 161, and the AUSF entity 141, the VPLMN-A 183 and/or the VPLMN-B 185 may also include a UDM device, a PCF device, and/or an AUSF entity.

Although not illustrated in FIG. 1, each of the HPLMN 181, VPLMN-A 183, and VPLMN-B 185 may also include an authentication, authorization and accounting (AAA) entity.

The UE 101 may also be referred to as a terminal, and the RANs 103, 103-2, and 103-3 may also be referred to as base stations.

The UE 101 may access the 5G core network through the RANs 103, 103-2, and 103-3.

The AMF 111 is an NF that may manage the mobility of the UE 101. The SMF 121 is an NF that may manage a PDU session connection provided to the UE 101. The UPF 131 may serve as a gateway for transmitting user data (e.g., a PDU) received from the UE 101 to a data network (DN) or for transmitting data from the DN to the UE.

The UPF devices 131-2 and 131-3, the SMF devices 121-2 and 121-3, and the AMF devices 111-2, and 111-3 operate the same manner as the above described UPF device 131, SMF device 121, and AMF device 111.

The AUSF 141 may perform authentication of the UE 101 in a 3GPP access network and a non-3GPP access network. The PCF 161 is an NF that may apply a service policy of a mobile communication operator to the UE 101, a billing policy, and a policy for a PDU session. The UDM 151 is an NF that may store information on subscribers and/or UEs.

The UPF 131 of the HPLMN 181 may be connected to each of the UPF 131-2 of the VPLMN-A 183 and the UPF 131-3 of the VPLMN-B 185. Further, the SMF 121 of the HPLMN 181 may be connected to each of the UPF 121-2 of the VPLMN-A 183 and the UPF 121-3 of the VPLMN-B 185.

In a recent wireless communication system, an N3 interworking function (N3IWF) is provided for the UE to communicate through non-3GPP access. When the UE communicates through non3GPP access, for session management, the control may be performed through the UE, non-3GPP access, N3IWF, and SMF, and for mobility management, the control may be performed through the UE, non 3GPP access, N3IWF, and AMF. Hereinafter, the difference between the 5G system and the previous 4G system and 3GPP access and non-3GPP access will be briefly described.

In a 5G or NR system, an AMF, which is a management entity that manages mobility of a UE, and an SMF, which is an entity that manages sessions, are separated. Accordingly, unlike in the 4G LTE communication system in which a mobility management entity (MME) performs both mobility management and session management, in the 5G or NR system, entities that perform mobility management and session management are separated. Accordingly, a communication method and a communication management method between the UE and the network entity have been changed.

For non-3GPP access, the 5G or NR system performs mobility management through the AMF via the N3IWF, and performs session management through the SMF. Further, the 5G or NR system processes security related information, which is an important factor in mobility management through the AMF.

As described above, in the 4G LTE system, the MME is in charge of both mobility management and session management. The 5G or NR system may support a non-standalone architecture that performs communication using together the network entity of the 4G LTE system.

In accordance with an embodiment of the disclosure, a terminal selects an operator PLMN in order to perform data communication by roaming to the VPLMN, and then PLMN information to be newly accessed is transmitted from the HPLMN to the terminal. Thereafter, the terminal verifies the information, and communicates according to the verification result (success/failure).

Further, in the 5G or NR system, entities that perform mobility management and session management are separated into the AMF and the SMF. In the 5G or NR system, a standalone deployment structure in which communication is performed only with 5G or NR entities and a non-standalone deployment structure in which 4G entities and 5G or NR entities are used together are being considered.

In a non-standalone deployment structure, when the UE communicates with the network, the control is performed by an eNB, which is a 4G base station, and in the core network, a deployment form similar to a 5G entity may also be used. In this case, mobility management between the UE and the AMF and session management between the UE and the SMF may be performed in NAS, which is a layer 3.

Although embodiments of the disclosure are described below with reference to a 50 or 4G LTE communication network, the embodiments may also be applied to other systems.

Figure 2:
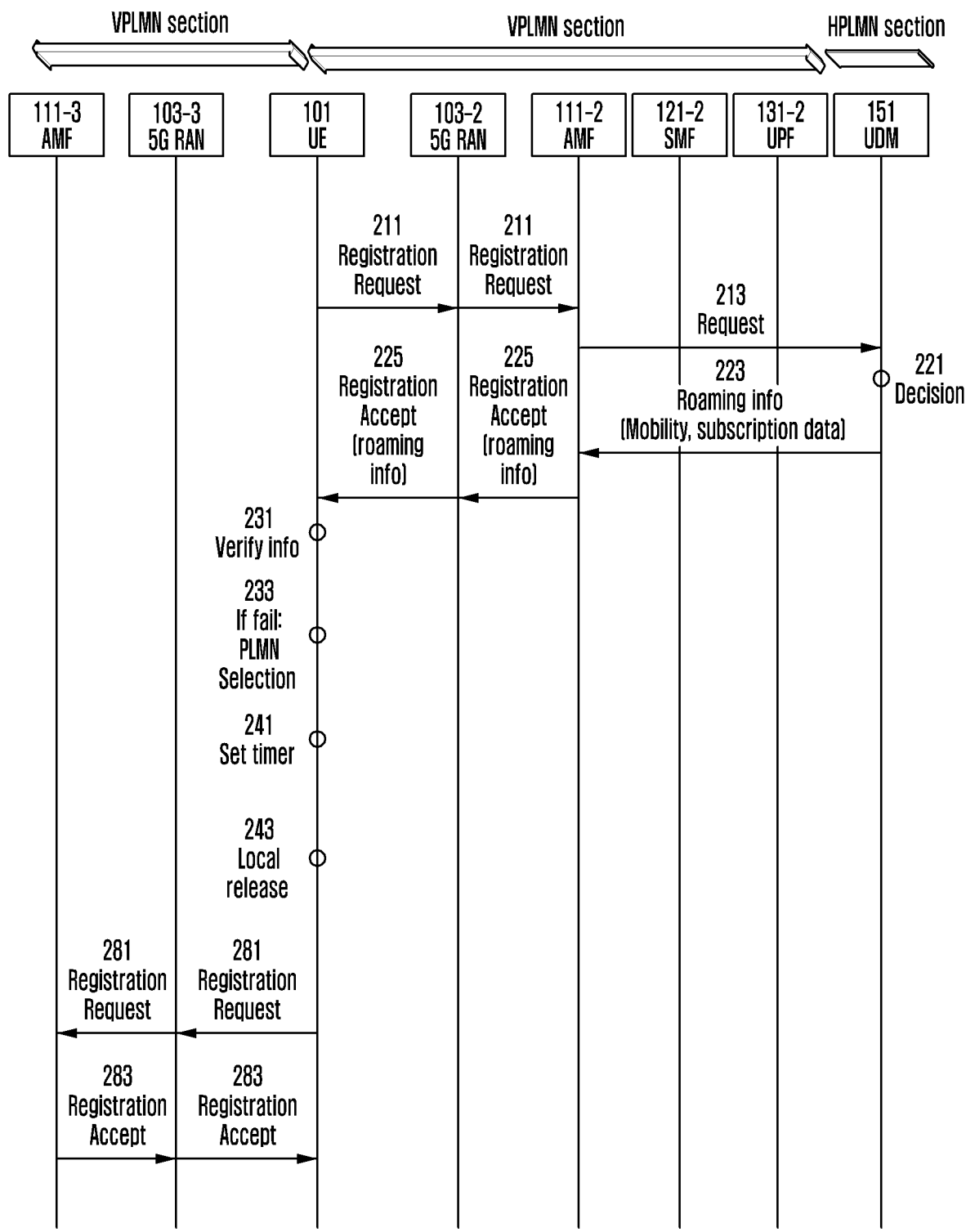
FIG. 2 is a signal flow diagram illustrating a data communication procedure of a terminal roaming in a 5G network according to an embodiment.

FIG. 2 is a signal flow diagram illustrating a data communication procedure of a terminal roaming in a 5G network according to an embodiment. For example, the procedure of FIG. 2 is described with reference to the network environment of FIG. 1.

Referring to FIG. 2, it is assumed that the UE 101 was in the HPLMN 181 and has move to a VPLMN, e.g., the VPLMN-A 183 or the VPLMN-B 185. It is also assumed that the HPLMN 181 may attempt to induce the UE 101 to access to another PLMN, e.g., for billing and service improvement.

After moving, as described above, it is assumed that the UE 101 is out of range of the HPLMN 181 and selects the VPLMN-A 183.

In step 211, the UE 101 transmits a registration request message to the AMF 111-2 of the VPLMN-A 183 through the 5G RAN 103-2 of the VPLMN-A 183.

In step 213, the AMF 111-2 accesses the HPLMN 181 in which the UE 101 is registered and transmits a request message, to the UDM 151 of the HPLMN 181, requesting VPLMN related information and subscription related information of the UE 101.

In step 221, the UDM 151 of the HPLMN 181 determines whether or not to transmit roaming related information to the UE 101. When the UDM 151 determines to send roaming related information, the UDM 151 may determine which information to send. That is, the UDM 151 of the HPLMN 181 may determine whether to transmit mobility related information for roaming and/or subscription related information to the UE 101. The subscription related information may include subscription information obtained by extracting only roaming related information from among subscription information that the UDM 151 possesses for the UE 101 or subscription information capable of being provided to an external PLMN among roaming related information. Further, when the UDM 151 determines to transmit information, the UDM 151 may determine which information to transmit among roaming related information. For example, the UDM 151 may determine information to be transmitted to the AMF 111-2 of the VPLMN-A 183 among mobility related information, and determine information to be transmitted to the AMF 111-2 of the VPLMN-A 183 among subscription information. In FIG. 2, the UDM 151 provides corresponding information to the AMF 111-2 of the VPLMN-A 183.

In step 223, the UDM 151 of the HPLMN 181 transmits, to the AMF 111-2 of the VPLMN-A 183, roaming related information such as mobility related information to be sent to the UE 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN, such as access technology to which the UE 101 may access, e.g., 4G LTE or 5G, may be transmitted together. A PLMN list and access technology information may be transmitted through PLMN operator controlled list information.

In step 225, the AMF 111-2 of the VPLMN-A 183 transmits a registration accept message to the UE 101 through the 5G RAN 103-2. Roaming related information that the AMF 111-2 of the VPLMN-A 183 receives from the UDM 151 of the HPLMN 181 may be transmitted to the UE 101 through the registration accept message. Such information may be secured and transmitted. For example, it may be transmitted as security protected information.

In step 231, the UE 101 verifies roaming related information included in the registration accept received from the AMF 111-2. For example, the UE 101 may identify whether security verification fails and/or succeeds by performing security verification on roaming related information that is security protected. When the security verification fails, the UE 101 may store the received PLMN related information as a forbidden PLMN in a forbidden PLMN list. The UE 101 may validate roaming information, e.g., the UE 101 may verify a validity of the roaming information.

More specifically, a registration accept message may be received from the HPLMN 181 registered by the UE 101, through the VPLMN-A 183 to which the UE 101 is currently accessed. In this case, the registration accept message may include information of another VPLMN (e.g., VPLMN-C), which is a new VPLMN other than the currently accessed VPLMN-A 183. The UE 101 may perform verification on the received message because the registration accept message is received with security protection. When the security verification fails, the UE 101 may store the VPLMN-C included in the registration accept message as a forbidden PLMN in the forbidden PLMN list stored in the UE 101.

Accordingly, when security verification fails, the UE 101 performs PLMN selection in step 233. In this case, the UE 101 may select a PLMN having a high priority to perform PLMN selection.

For example, the UE 101 releases the PDU session established with VPLMN-A 183 based on the roaming-related information, and selects a VPLMN (e.g., VPLMN-B 185 from a PLMN list available for registration) from the roaming-related information.

In step 241, the UE 101 sets a timer to release the PDU session previously performed by the UE 101, i.e., established with the VPLMN-A 183. The timer may utilize a timer value defined in the standard in relation to the release of a PDU session or may set a new timer value.

In step 243, if there is a communicating PDU session, the UE 101 may locally release the corresponding PDU session. For example, the UE 101 may release a corresponding session after a certain period of time without communication with the network. Alternatively, when a timer value set by the UE 101 expires, the UE 101 may release the corresponding session, thereby releasing the session established with the VPLMN-A 183.

In step 281, the U E 101 transmits a registration request message to the AMF 111-3 of the VPLMN-B 185. That is, the UE 101 selects the VPLMN-B 185 from a list of VPLMNs in which the UE 101 may register, received in the roaming information in step 225, and transmits a registration request message to the VPLMN-B 185. The IE 101 may select an arbitrary PLMN among the list of VPLMNs or may select a PLMN having a high priority, as described above. Although not illustrated in FIG. 1, the UE 101 may also verify that the VPLMN-B 185 is not included in the forbidden PLMN list stored in the UE 101, prior to transmitting a registration request message to the VPLMN-B 185.

Alternatively, in step 281, the UE 101 may transmit a registration request message to the AMF 111-3 through the 5G RAN 103-3 of the VPLMN-B 185.

In step 283, the AMF 111-3 transmits a registration accept message to the UE 101.

Figure 3:
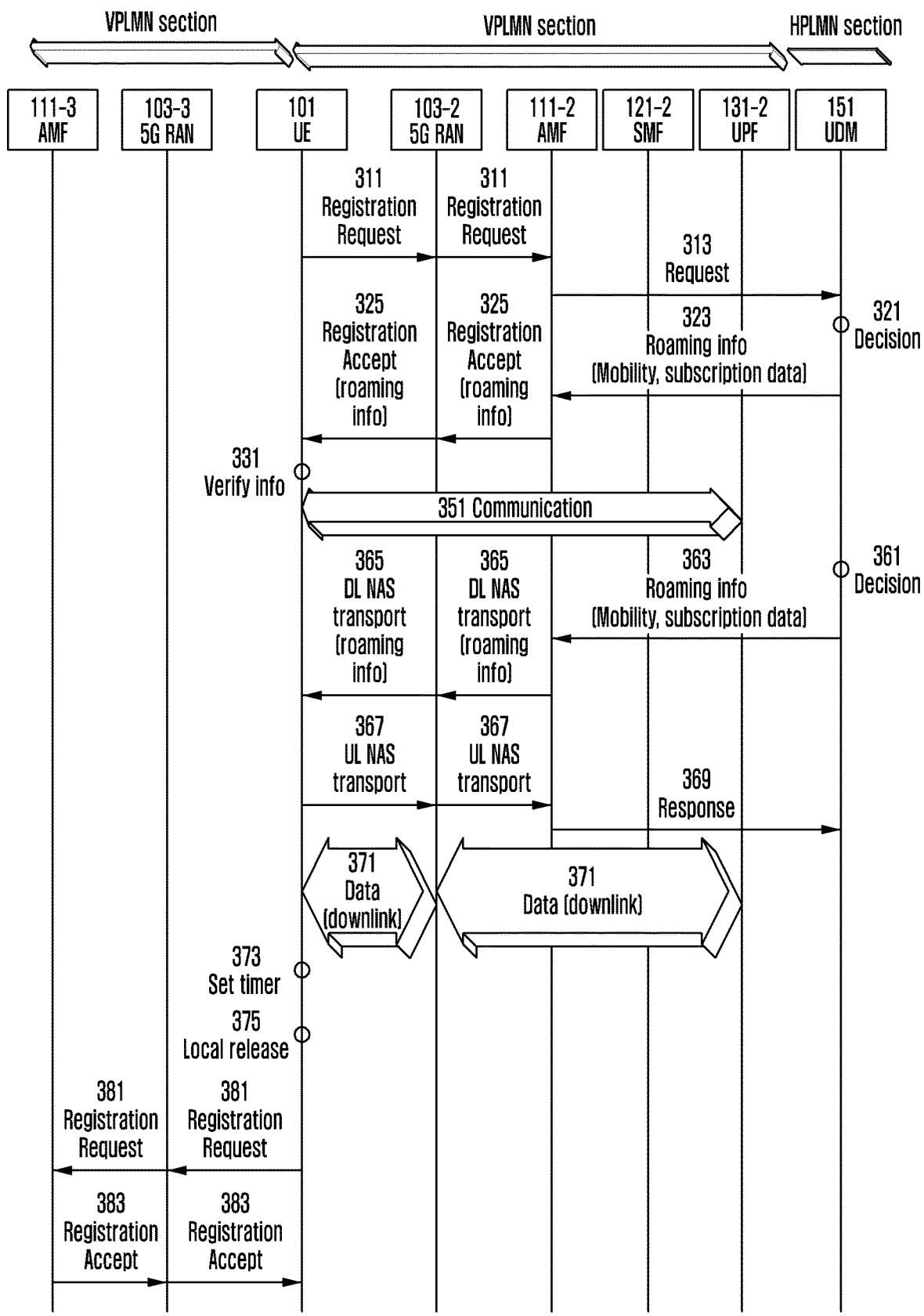
FIG. 3 is a signal flow diagram illustrating a data communication procedure of a terminal in a 5G network according to an embodiment.

FIG. 3 is a signal flow diagram illustrating a data communication procedure of a terminal in a 5G network according to an embodiment. For example, the procedure of FIG. 3 is described with reference to the network environment of FIG. 1.

Referring to FIG. 3, the UE 101 has moved out of range of the HPLMN 181 and selects the VPLMN-A 183.

In step 311, the UE 101 transmits a registration request message to the AMF 111-2 of the VPLMN-A 183 through the 5G RAN 103-2 of the VPLMN-A 183.

In step 313, the AMF 111-2 accesses the HPLMN 183 in which the UE 101 is registered and transmits a request message, to the UDM 151 of the HPLMN 181, requesting VPLMN related information and subscription related information of the UE 101.

In step 321, the UDM 151 of the HPLMN 181 may determine whether or not to send roaming related information to be transmitted to the UE 101. When the UDM 151 determines to send roaming related information, the UDM 151 may determine which roaming related information to send. That is, the UDM 151 may determine whether to transmit, to the UE 101, mobility related information, subscription related information, etc., in relation to roaming. The subscription related information may include subscription information obtained by extracting only roaming related information from among subscription information that the UDM 151 possesses for the UE 111 or changed subscription information to be provided to an external PLMN from among roaming related information. For example, the UDM 151 may determine information among mobility related information and among subscription information to be transmitted to the AMF 111-2 of the VPLMN-A 183. In FIG. 3, it is assumed that the UDM 151 provides corresponding information to the AMF 111-2 of the VPLMN-A 183.

In step 323, the UDM 151 of the HPLMN 181 may transmit, to the AMF 111-2 of the VPLMN-A 183, roaming related information such as mobility related information to be sent to the UE 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN, such as access technology to which the UE 101 may access, e.g., 4G LTE or 5G, may be transmitted together.

The PLMN list and access technology information may be transmitted through PLMN operator controlled list information.

In step 325, the AMF 111-2 of the VPLMN-A 183 transmits a registration accept message to the UE 101 through the 5G RAN 103-2. Roaming related information that the AMF 111-2 of the VPLMN-A 183 receives from the UDM 115 of the HPLMN 181 may be transmitted to the UE 101 through the registration accept message. Such information may be secured and transmitted, e.g., as security protected information.

In step 331, the UE 101 verifies roaming related information included in the registration accept message received from the AMF 111-2 of the VPLMN-A 183. For example, the UE 101 may identify whether security verification fails and/or succeeds by performing security verification on roaming related information that is security protected. When security verification fails, the UE 101 may store received PLMN related information as a forbidden PLMN in a forbidden PLMN list. Accordingly, the UE 101 may validate roaming information, e.g., verify a validity of the roaming information.

For example, a registration accept message may be received from the HPLMN 181 registered by the UE 101 through the VPLMN-A 183 to which the UE 101 is currently accessed. The registration accept message may include information of a VPLMN-C, which is a new VPLMN other than the currently accessed VPLMN-A 183. The UE 101 may perform verification on the received message because the registration accept message is received with security protection. When security verification fails, the UE 101 may store the VPLMN-C as a forbidden PLMN in the forbidden PLMN list stored in the UE 101.

If verification is successful, the UE 101 may be registered in the currently accessed VPLMN-A 183, and in step 351, the UE 101 communicates with the VPLMN-A 183. FIG. 3 illustrates an example in which uplink and downlink data are transmitted and received in step 351, i.e., communication is performed through the UPF 131-2.

Thereafter, when the UE 101 needs to change roaming related information while communicating with the VPLMN-A, an operator of the HPLMN 181 may update accessible roaming related information in step 361. The disclosure does not place any particular restrictions on the reason for changing the roaming related information of the UE 101 in the HPLMN 181.

In FIG. 3, the UE 101 is communicating with the VPLMN-A 183, but the roaming related information of the UE 101 is changed in the HPLMN 181. Therefore, when attempting to change the roaming information of the UE 101 in the middle of communication, as in steps 363, 365, and 367, a message transmitted from the HPLMN 181 may be transmitted to the UE 101 through the VPLMN-A 183 using a downlink (DL) NAS transport message, and the UE 101 may transmit a response message to the HPLMN 181 using an uplink (UL) NAS transport message through the VPLMN-A 183.

More specifically, in step 363, the UDM 151 of the HPLMN 181 sends, to the AMF 111-2 of the VPLMN-A 183, roaming related information such as mobility related information to be sent to the UP 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN, such as an access technology to which the UE 101 may access, e.g., 4G LTE or 5G, may be transmitted together.

The PLMN list and access technology information may be transmitted through PLMN operator controlled list information.

In step 365, the AMF 111-2 of the VPLMN-A 183 transmits a DL NAS transport message to the UE 101. Roaming related information that the AMF 111-2 of the VPLMN-A receives from the UDM 151 of the HPLMN 181 may be transmitted to the UE 101 through the 5G RAN 103-2 of the VPLMN-A 183 using the DL NAS transport message.

In step 367, the UE 101 sends a response message, to the AMF 111-2 of the VPLMN-A 183 through the 5G RAN 103-2, using the UL NAS transport message, indicating that the roaming-related information has been received.

In step 369, the AMF 111-2 of the VPLMN-A 183 sends a response message to the UDM 151 of the HPLMN 181 to notify that the corresponding information has been updated.

In step 371, data is transmitted from the UPF 131-2 of the VPLMN-A 183 to the UE 101, through a DL.

In step 373, in order to release the PDU session previously performed by the UE 101, the UE 101 sets a timer. The timer may utilize a timer value defined in the standard in relation to the release of a PDU session or may set a new timer value.

In step 375, if there is a communicating PDU session, the UE 101 may locally release the PDU session. For example, the UE 101 may release a corresponding session after a certain period of time without communication with the VPLMN-A 183. As another example, when a timer value set by the UE 101 expires, the UE 101 may release the corresponding session.

The UE 101 releases the PDU session established with VPLMN-A 183 based on the roaming-related information, and selects a VPLMN (e.g., a VPLMN in a PLMN list available for registration) from the roaming-related information.

In step 381, the UE 101 that releases the session with VPLMN-A 183 transmits a registration request message to the AMF 111-3 of the VPLMN-B 185. For example, the UE 101 may select the VPLMN-B 185 from the PLMN list indicating VPLMNs to which the UE 101 may register based on the roaming information received in step 325 and transmit a registration request message. In this case, the UE 101 may select an arbitrary PLMN among the registerable PLMN list as the VPLMN or may select a PLMN having a high priority, as described above with reference to FIG. 2.

In step 383, the AMF 111-3 of the VPLMN-B 185 transmits a registration accept message to the UE 101.

Figure 4:
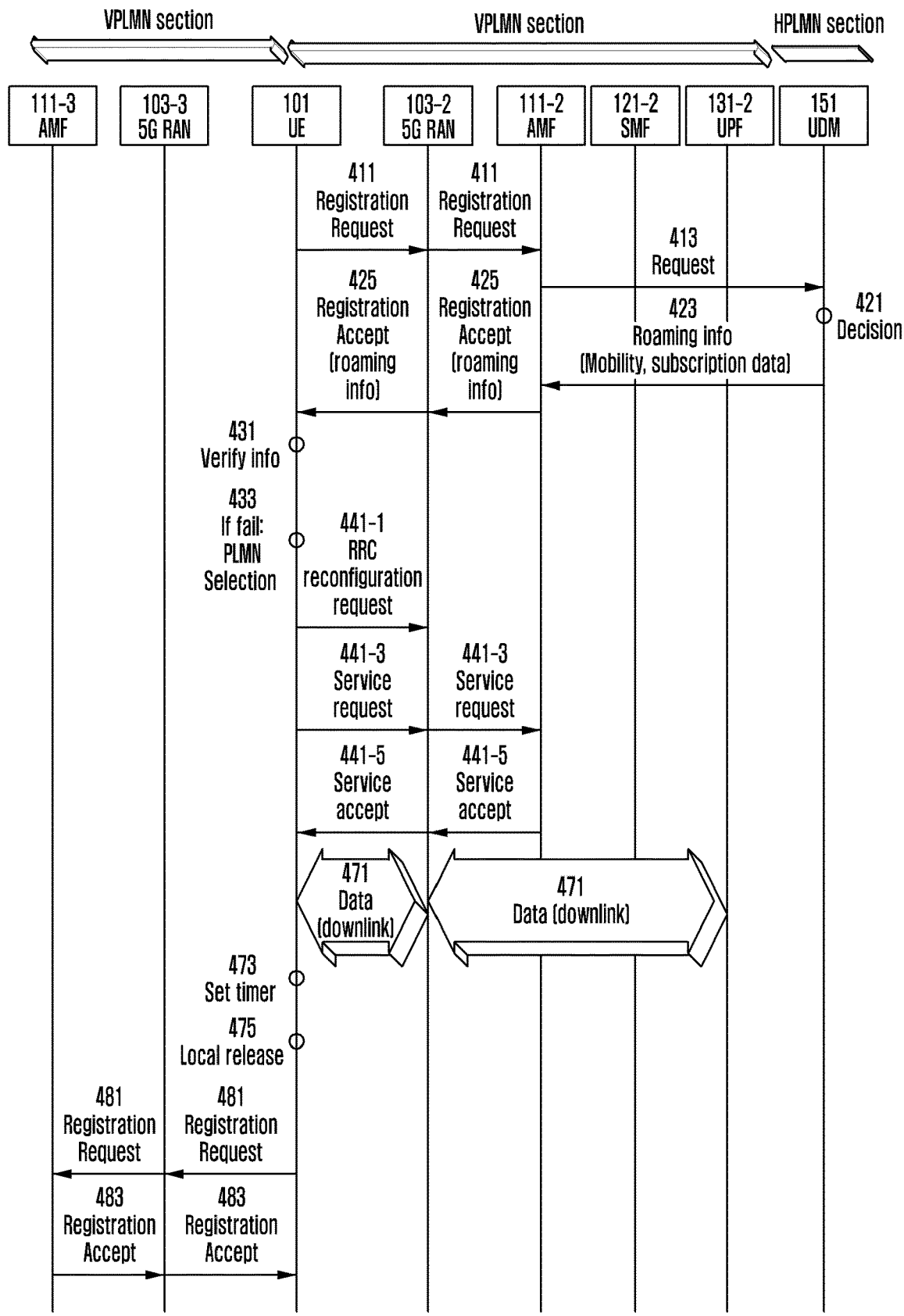
FIG. 4 is a signal flow diagram illustrating a data communication procedure of a terminal in a 5G network according to an embodiment.

FIG. 4 is a signal flow diagram illustrating a data communication procedure of a terminal in a 5G network according to an embodiment. For example, the procedure of FIG. 4 is described with reference to the network environment of FIG. 1.

Referring to FIG. 4, the UE 101 moves out of range of the HPLMN 181 and selects the VPLMN-A 183.

In step 411, the UE 101 transmits a registration request message to the AMF 111-2 of the VPLMN-A 183, through the 5G RAN 103-2 of the VPLMN-A 183.

In step 413, the AMF 111-2 that has received the registration request message from the UE 111 accesses the HPLMN 181 in which the UE 101 is registered and transmits a request message, to the UDM 15I of the HPLMN 181, requesting VPLMN related information and subscription related information of the UE 101.

In step 421, the UDM 151 of the HPLMN 181 determines whether or not to send roaming related information to be transmitted to the UE 101. When the UDM 151 determines to send roaming related information, the UDM 151 may determine which information to send. That is, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 111 or changed subscription information to be provided to an external PLMN among roaming related information. For example, the UDM 151 may determine information among mobility related information and among subscription information to be transmitted to the AMF 111-2 of the VPLMN-A 183. In FIG. 3, the UDM 151 provides corresponding information to the AMF 111-2 of the VPLMN-A 183.

In step 423, the UDM 151 of the HPLMN transmits, to the AMF 111-2 of the VPLMN-A 183, roaming related information such as mobility related information to be sent to the UE 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN such as access technology to which the UE 101 may access, e.g., 4G LTE or 5G, may be transmitted together.

The PLMN list and access technology information may be transmitted through PLMN operator controlled list information.

In step 425, the AMF 111-2 of the VPLMN-A 183 may transmit a registration accept message to the UE 101 through the 5G RAN 103-2. Roaming related information that the AMF 111-2 of the VPLMN-A 183 receives from the UDM 115 of the HPLMN 181 may be transmitted to the UE 101 through the registration accept message. Such information may be secured and transmitted, e.g., as security protected information.

In step 431, the UE 101 verifies roaming related information included in the registration accept received from the AMF 111-2 of the VPLMN-A through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list.

For example, a registration accept message may be received from the HPLMN 181 registered by the UE 101 through the VPLMN-A 183 to which the UE 101 currently accesses. The registration accept message may include information of a VPLMN-C, which is a new VPLMN other than the currently accessed VPLMN-A. The UE 101 may perform verification on the received message because the registration accept message is received with security protection. When security verification fails, the UE 101 may store the VPLMN-C as a forbidden PLMN in the forbidden PLMN list stored in the UE 101. Accordingly, the UE 101 may validate roaming information, e.g., verify a validity of roaming information.

In this way, in the case that security verification fails, the UE 101 may perform PLMN selection in step 433. In this case, the UE 101 may select a PLMN having a high priority to perform PLMN selection.

The UE 101 releases the PDU session established with VPLMN-A 183 based on the roaming-related information, and selects a VPLMN (e.g., a VPLMN in a PLMN list available for registration) from the roaming-related information.

In step 441-1, the UE 101 transmits a radio resource control (RRC) reconfiguration request message to the 5G RAN 103-2 of the VPLMN-A 183. In step 441-3, a service request message, which is a NAS message, is transmitted to the AMF 111-2 through the 5G RAN 103-2 of the VPLMN-A 183. Although FIG. 4 illustrates steps 441-1 and 441-3 as separate steps, the service request message of step 441-3 may be transmitted to the AMF 111-2 of the VPLMN-A through the 5G RAN 103-2 of the VPLMN-A together with the RRC message in step 441-1.

In step 441-5, the AMF 111-2 of the VPLMN-A 183 transmits a service accept message to the UE 101 through the 5G RAN 103-2 of the VPLMN-A 183.

In step 471, data is transmitted from the UPF 131-2 of the VPLMN-A 183 to the UE 101, through a DL.

In step 473, a timer is set to release the PDU session established with the VPLMN-A 183. The timer may utilize a timer value defined in the standard in relation to the release of a PDU session or may set a new timer value.

In step 475, if there is a communicating PDU session, the UE 101 locally releases the PDU session. For example, the UE 101 may release a corresponding session after a certain period of time without communication with the network. Alternatively, when a timer value set by the UE 101 expires, the UE 101 releases the corresponding session, thereby releasing the session established with the VPLMN-A 183.

In step 481, the UE 101 transmits a registration request message to the AMF 111-3 through the 5G RNA 103-3 of the VPLMN-B 185. The UE 101 may select the VPLMN-B 185 from a PLMN list in which the UE 101 may register in the roaming related information received from the VPLMN-A 183 in step 425 and transmit a registration request message.

In step 483, the AMF 111-3 of the VPLMN-B 185 transmits a registration accept message to the UE 101.

Figure 5:
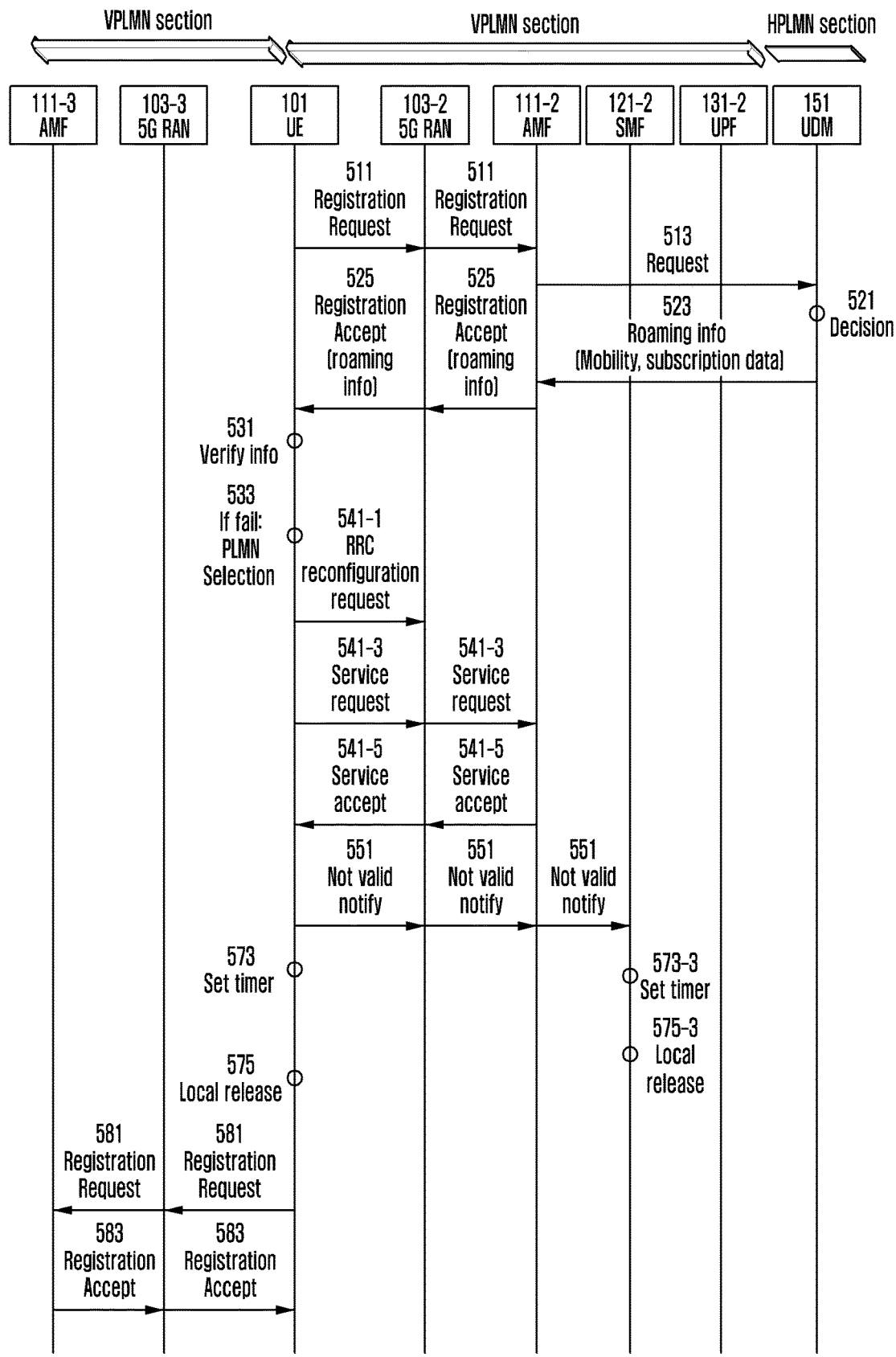
FIG. 5 is a signal flow diagram illustrating a data communication procedure of a terminal in a 5G network according to an embodiment.

FIG. 5 is a signal flow diagram illustrating a data communication procedure of a terminal in a 5G network according to an embodiment. For example, the procedure of FIG. 5 is described with reference to the network environment of FIG. 1

Referring to FIG. 5, the UE 101 moves out of range of the HPLMN 181 and selects the VPLMN-A 183.

In step 511, the UE 101 transmits a registration request message to the AMF 111-2 of the VPLMN-A 183, through the 5G RAN 103-2 of the VPLMN-A.

In step 513, the AMF 111-2 that has received the registration request message from the UE 111 accesses the HPLMN 181 in which the UE 101 is registered and transmits a request message, to the UDM 151 of the HPLMN 181, requesting VPLMN related information and subscription related information of the UE 101.

In step 521, the UDM 151 of the HPLMN 181 determines whether or not to transmit roaming related information to be transmitted to the UE 101. When the UDM 151 determines to send roaming related information, the UDM 151 may determine which information to send. That is, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 111 or changed subscription information to be provided to an external PLMN among roaming related information. For example, the UDM 151 may determine information among mobility related information and among subscription information to be transmitted to the AMF 111-2 of the VPLMN-A 183. In FIG. 3, the UDM 151 determines to provide corresponding information to the AMF 111-2 of the VPLMN-A 183.

In step 523, the UDM 151 of the HPLMN 181 transmits, to the AMF 111-2 of the VPLMN-A 183, roaming related information such as mobility related information to be sent to the UE 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN such as an access technology to which the UE 101 may access, e.g., 4G LTE or 5G, may be transmitted together.

The PLMN list and access technology information may be transmitted through PLMN operator controlled list information.

In step 525, the AMF 111-2 of the VPLMN-A 183 transmits a registration accept message to the UE 101 through the 5G RAN 103-2. Roaming related information that the AMF 111-2 of the VPLMN-A 183 receives from the UDM 115 of the HPLMN 181 may be transmitted to the UE 101 through the registration accept message. Such information may be secured and transmitted, e.g., as security protected information.

In step 531, the UE 101 verifies roaming related information included in the registration accept received from the AMF 111-2 of the VPLMN-A 183 through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list. Accordingly, the UE 101 may validate roaming information, e.g., verify a validity of roaming information.

For example, a registration accept message may be received from the HPLMN 181 registered by the UE 101 through the VPLMN-A 183 to which the UE 101 currently accesses. The registration accept message may include information of a VPLMN-C, which is a new VPLMN other than the currently accessed VPLMN-A. The UE 101 may perform verification on the received message because the registration accept message is received with security protection. When security verification fails, the UE 101 may store the VPLMN-C as a forbidden PLMN in the forbidden PLMN list sored in the UE 101.

In step 533, when security verification fails, the UE 101 performs PLMN selection. For example, the UE 101 may select a PLMN having a high priority to perform PLMN selection.

The UE 101 releases the PDU session established with VPLMN-A 183 based on the roaming-related information, and selects a VPLMN (e.g., a VPLMN in a PLMN list available for registration) from the roaming-related information.

In step 541-1, the UE 101 transmit an RRC reconfiguration request message to the 5G RAN 103-2 of the VPLMN-A 183.

In step 541-3, the UE 101 transmits a service request message, which is a NAS message, to the AMF 111-2 of the VPLMN-A 183 through the 5G RAN 103-2 of the VPLMN-A 183. Although FIG. 5 illustrates the service request message in step 541-3 being transmitted in separate step, it may be transmitted to the AMF 111-2 of the VPLMN-A 183 through the 5G RAN 103-2 of the VPLMN-A 183 together with the RRC message in step 541-3.

In step 541-5, the AMF 111-2 of the PLMN-A 183 transmits a service accept message to the UE 101 through the 5G RAN 103-2 of the VPLMN-A 183.

In step 551, the UE 101 transmits a message, to the AMF 111-2 of the VPLMN-A 183 and/or the SMF 121-2 of the VPLMN-A 183, notifying not valid. In step 551, a notification of not valid may be made in at least one of the following three cases.

Case 1: the UE 101 may notify the AMF 111-2 and the SMF 121-2 of the VPLMN-A 183 that roaming information is not valid.

Case 2: the UE 101 may notify the SMF 121-2 of the VPLMN-A 183 to suspend transmission of the PDU session. In this case, a PDU session suspend notify message may be used.

Case 3: the UE 101 may notify the SMF 121-20 of the VPLMN-A 183 to release the PDU session.

In step 573, a timer is set to release the PDU session established with the VPLMN-A 183. The timer may utilize a timer value defined in the standard in relation to the release of a PDU session or may set a new timer value.

In step 573-3, the SMF 121-2 of the VPLMN-A 183 that has received the notification from the UE 101 sets a timer for releasing the PDU session. The timer value may also be set to the same value as that of the above timer.

In step 575, if there is a PDU session that the UE 101 is currently establishing with the VPLMN-A, the UE 101 locally releases the corresponding PDU session. That is, the UE 101 may release the corresponding session after a certain period of time without communication with the VPLMN-A 183. Alternatively, when a timer value set by the UE 101 expires, the corresponding session may be released.

The same procedure may be performed even in the VPLMN-A 183.

More specifically, in step 575-3, if there is a PDU session established to the UE 101, the SMF 121-2 of the VPLMN-A 183 locally releases the corresponding PDU session. That is, the SMF 121-2 of the VPLMN-A 183 may release the corresponding session after a certain period of time without additional communication with the UE 101. Alternatively, as described above, when a timer value set by the SMF 121-2 of the VPLMN-A 183 expires, the corresponding session may be released.

In step 581, after releasing the session established with the VPLMN-A 183, the UE 101 transmits a registration request message to the AMF 111-3 of the VPLMN-B 185. For example, the UE 101 may select the VPLMN-B 185 from a PLMN list to which the UE 101 may register in the roaming related information received from the VPLMN-A 183 in step 541 and transmit a registration request message.

In step 583, the AMF 111-3 of the VPLMN-B 185 transmits a registration accept message to the UE 101.

Figure 6:
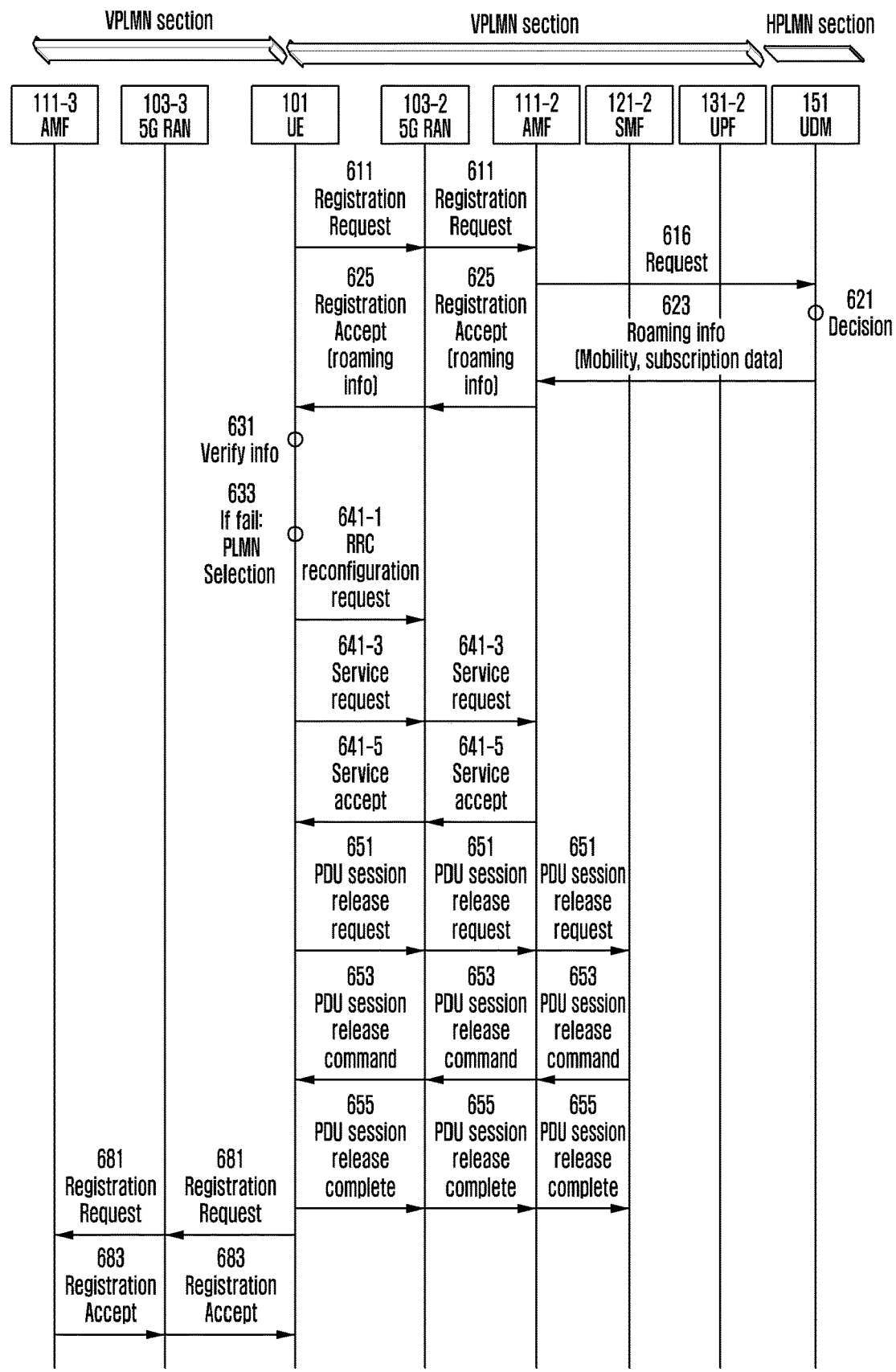
FIG. 6 is a signal flow diagram illustrating a data communication procedure of a terminal in a 5G network according to an embodiment.

FIG. 6 is a signal flow diagram illustrating a data communication procedure of a terminal in a 5G network according to an embodiment. For example, the procedure of FIG. 6 is described with reference to the network environment of FIG. 1.

Referring to FIG. 6, the UE 101 moves out of range of the HPLMN 181 and selects the VPLMN-A 183.

In step 611, the UE 101 transmits a registration request message to the AMF 111-2 of the VPLMN-A 183, through the 5G RAN 103-2 of the VPLMN-A 183.

In step 613, the AMF 111-2 that has received the registration request message from the UE 111 accesses the HPLMN 181 in which the UE 101 is registered and transmits a request message, to the UDM 151 of the HPLMN 181, requesting VPLMN related information and subscription related information of the UE 101.

In step 621, the UDM 151 of the HPLMN 181 determines whether or not to transmit roaming related information to be transmitted to the UE 101. When the UDM 151 determines to send roaming related information, the UDM 151 may determine which information to send. For example, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 11 or changed subscription information to be provided to an external PLMN among roaming related information. For example, the UDM 151 may determine information among mobility related information and among subscription information to be transmitted to the AMF 111-2 of the VPLMN-A 183. In FIG. 3, the UDM 151 determines to provide corresponding information to the AMF 111-2 of the VPLMN-A.

In step 623, the UDM 151 of the HPLMN 181 transmits, to the AMF 111-2 of the VPLMN-A 183, roaming related information such as mobility related information to be sent to the UE 101, changed subscription data information, and VPLMN information to be accessed by the UE 101. In order to update VPLMN information that the UE 101 may select in relation to roaming, the UDM 151 may transmit corresponding information using a NAS message. A VPLMN related PLMN list and access technology information for use when selecting a PLMN such as an access technology to which the UE 101 may access. e.g., 4G LTE or 5G, may be transmitted together.

The PLMN list and access technology information may be transmitted through PLMN operator controlled list information.

In step 625, the AMF 111-2 of the VPLMN-A 183 may transmit a registration accept message to the UE 101 through the 5G RAN 103-2. Roaming related information that the AMF 111-2 of the VPLMN-A 183 receives from the UDM 115 of the HPLMN 181 may be transmitted to the UE 101 through the registration accept message. Such information may be secured and transmitted, e.g., as security protected information.

In step 631, the UE 101 verifies roaming related information included in the registration accept received from the AMF 111-2 of the VPLMN-A 183 through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list.

For example, a registration accept message may be received from the HPLMN 181 registered by the UE 101 through the VPLMN-A 183 to which the UE 101 currently accesses, the registration accept message may include information of a VPLMN-C, which is a new VPLMN other than the currently accessed VPLMN-A. The UE 101 may perform verification on the received message because the registration accept message is received with security protection. When security verification fails as a result of performing the verification, the UE 101 may store the VPLMN-C included in the registration accept message as a forbidden PLMN in the forbidden PLMN list stored in the UE 101.

In step 633, when security verification fails, the UE 101 performs PLMN selection. For example, the UE 101 may select a PLMN having a high priority to perform PLMN selection.

In step 641-1, the UE 101 transmits an RRC reconfiguration request message to the 5G RAN 103-2 of the VPLMN-A 183. In step 641-3, the UE 101 transmits a service request message, which is a NAS message, to the AMF 111-2 of the VPLMN-A through the 5G RAN 103-2 of the VPLMN-A. Although FIG. 6 illustrates the service request message being transmitted separately in step 641-3, it may be transmitted to the AMF 111-2 of the VPLMN-A 183 through the 5G RAN 103-2 of the VPLMN-A 183 together with the RRC message in step 641-1.

In step 641-5, the AMF 111-2 of the VPLMN-A 183 transmits a service accept message to the UE 101 through the 5G RAN 103-2 of the VPLMN-A 183.

Thereafter, in step 651, the PDU session is released between the UE 101 and the VPLMN-A 183. A procedure for releasing the PDU session in step 651 may be performed in one of the following two cases.

Case 1: the UE 101 may send a PDU session release request message to the SMF 121-2 of the VPLMN-A 183. This is to synchronize PDU session between the UE 101 and the VPLMN-A 183 by sending a PDU session release request from the UE 101 to the SMF 121-2 of the VPLMN-A 183. Accordingly, the SMF 121-2 of the VPLMN-A 183 may transmit a PDU session release command message to the UE 101 in step 653. Therefore, the UE 101 may release the PDU session between the UE 101 and the VPLMN-A 183 by transmitting a PDU session release complete message to the SMF 121-2 of the VPLMN-A 183.

Case 2: the UE 101 may transmit a notification message indicating that the PDU session is no longer valid to the SMF 121-2 of the VPLMN-A 183. Therefore, in step 653, the SMF 121-2 of the VPLMN-A 183 may transmit a PDU session release command message to the UE 101 to trigger the PDU session release. That is, step 551 of FIG. 5 described above may be performed instead of step 651 of FIG. 6, and then steps 653 and 655 may be performed.

In step 653, the SMF 121-2 of the VPLMN-A 183 may send a PDU session release command message to the UE 101.

In step 655, the UE 101 may send a PDU session release complete message to the SMF 121-2 of the VPLMN-A 183. As described above, in step 681, after the PDU session with the VPLMN-A 183 is released, the UE 101 transmits a registration request message to the AMF 111-3 of the VPLMN-B 185 through the 5G RAN 103-3 of the VPLMN-B 185. The UE 101 may select the VPLMN-B 185 from a PLMN list to which the UE 101 may register in the roaming related information received from the VPLMN-A 183 in step 625 and transmit a registration request message.

In step 683, the AMF 111-3 of the VPLMN-B 185 transmits a registration accept message to the UE 101.

Figure 7:
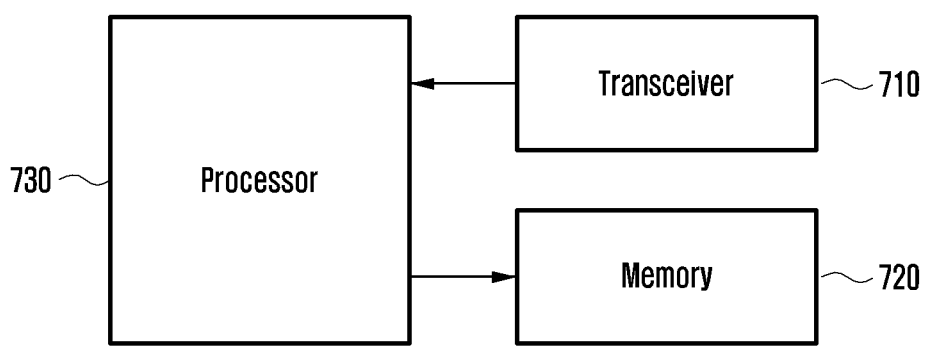
FIG. 7 is a block diagram illustrating a terminal according to an embodiment.

FIG. 7 is a block diagram illustrating a terminal according to an embodiment. For example, the terminal in FIG. 7 may operate as the UE 101 illustrated in FIGS. 2 to 6.

Referring to FIG. 7, the terminal includes a transceiver 710, a memory 720, and a processor 730. Alternatively, the terminal may include more components or fewer components than illustrated in FIG. 7. Further, at least two of the processor 730, the transceiver 710, and the memory 720 may be implemented in the form of a single chip.

The transceiver 710, which collectively refers to a receiver and a transmitter, may transmit and receive signals, e.g., control information and data, to and from a base station, a network entity, and/or an NF. The transceiver 710 may include a radio frequency (RF) transmitter that up-converts and amplifies a frequency of a signal to be transmitted, and an RF receiver that low-noise amplifies a received signal and down-converts a frequency thereof. However, components of the transceiver 710 are not limited to the RF transmitter and the RF receiver.

Further, the transceiver 710 may include a wired or wireless transceiver and include various components for transmitting and receiving signals.

The transceiver 710 may receive a signal through a wireless charnel, output the signal to the processor 730, and transmit the signal output from the processor 730 through a wireless channel.

The transceiver 710 may receive a communication signal and output the communication signal to the processor 730, and transmit the signal output from the processor 730 to a network entity and/or an NF through the wired or wireless network.

The memory 720 may store programs and data for operation of the terminal. The memory 720 may store control information or data included in a signal obtained by the terminal. The memory 720 may include various types of storage media such as a read only memory (ROM), random access memory (RAM), hard disk, compact disc read only memory (CD-ROM), digital versatile disc (DVD), or a combination of storage media.

The processor 730 may control a series of processes so that the terminal may operate according to an embodiment of the disclosure described above with reference to FIGS. 1 to 6. The processor 730 may include one or more microprocessors. For example, the processor 730 may include a communication processor (CP) that performs control for communication and an application processor (AP) that controls upper layers such as application programs. Further, the CP and/or the AP may have one or more cores.

Figure 8:
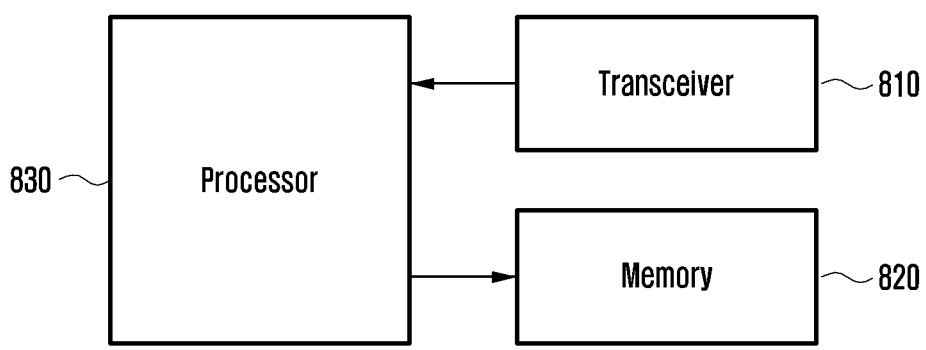
FIG. 8 is a block diagram illustrating a network entity according to an embodiment.

FIG. 8 is a block diagram illustrating a network entity according to an embodiment. For example, the network entity may be a network entity of a 3G core network and a 4G core network, and an NF of a 5G core network. Hereinafter, both the NF and the network entity will be collectively referred to as a network entity.

Referring to FIG. 8, a network entity includes a transceiver 810, a memory 820, and a processor 830. Components of the network entity are not limited to the components illustrated in FIG. 8. For example, the network entity may include more or fewer components than those illustrated in FIG. 8. Further, at least two of the processor 830, the transceiver 810, and the memory 820 may be implemented in the form of a single chip.

The network entity may be an NF, such as an AMF, SMF, PCF, NEF, UDM, and UPF, as described above. Further, the network entity may be a base station.

The transceiver 810, which collectively refers to a receiver and a transmitter, and may transmit and receive signals, e.g., control information and data, to and from a terminal or another network entity. The transceiver 810 may include an RF transmitter that up-converts and amplifies a frequency of a signal to be transmitted, and an RF receiver that low-noise amplifies a received signal and down-converts a frequency thereof. However, components of the transceiver 810 are not limited to the RF transmitter and the RF receiver. The transceiver 810 may include a wired or wireless transceiver, and include various components for transmitting and receiving signals.

Further, the transceiver 810 may receive a signal through a communication channel (e.g., wireless channel), output the signal to the processor 830, and transmit the signal output from the processor 830 through the communication channel.

The transceiver 810 may receive a communication signal and output the communication signal to the processor 830, and transmit the signal output from the processor 830 to a terminal or network entity through a wired or wireless network.

The memory 820 may store programs and data for operation of network entities. Further, the memory 820 may store control information or data included in a signal obtained from the network entity. The memory 820 may include a storage medium such as a ROM, a RAM, a hard disk, a CD-ROM, a DVD, or a combination of storage media.

The processor 830 may control a series of processes so that the network entity may operate according to the embodiments of FIGS. 1 to 6 described above. For example, when the network entity is an AMF, the network entity may control a series of processes described in FIGS. 2 to 6.

As another example, when the network entity is the AMF 111-2 of the VPLMN-A 183 of FIG. 2, the network entity may perform the control such as reception of registration request message of step 211, transmission of a request message to the HPLMN 181, reception of roaming information from the HPLMN 181, and transmission of a registration accept message to the UE 101.

Further, when the network entity is the AMF 111-3 of the VPLMN-B 185 of FIG. 2, the network entity may perform the control such as reception of a registration request message and transmission of a registration accept message to the UE 101 in step 281. Because the same may be applied to other drawings and other NFs, additional description will be omitted.

The processor 830 may include one or more microprocessors. When the processor 830 is implemented into a single microprocessor, the processor 830 may include a plurality of cores for higher-speed processing.

Methods according to the above-described embodiments of the disclosure may be implemented in the form of hardware, software, or a combination of hardware and software.

When implemented in software, a computer readable storage medium storing one or more programs (software modules) may be provided. One or more programs stored in the computer readable storage medium may be configured for execution by one or more processors in an electronic device. The one or more programs may include instructions for causing an electronic device to execute methods according to embodiments of the disclosure.

Such programs (software modules, software) may be stored in a random access memory, a non-volatile memory including a flash memory, a ROM, an electrically erasable programmable ROM (EEPROM), a magnetic disc storage device, a CD-ROM, a DVD, any other form of optical storage device, or a magnetic cassette. Alternatively, the programs may be stored in a memory including a combination of some or all thereof. Further, each constitution memory may be included in the plural.

Further, the program may be stored in an attachable storage device that may access through a communication network such as the Internet, Intranet, local area network (LAN), wide area network (WAN), or storage area Network (SAN), or a communication network composed of a combination thereof. Such a storage device may access to a device implementing an embodiment of the disclosure through an external port. Further, a separate storage device on a communication network may access to a device implementing the embodiment of the disclosure.

Figure 9:
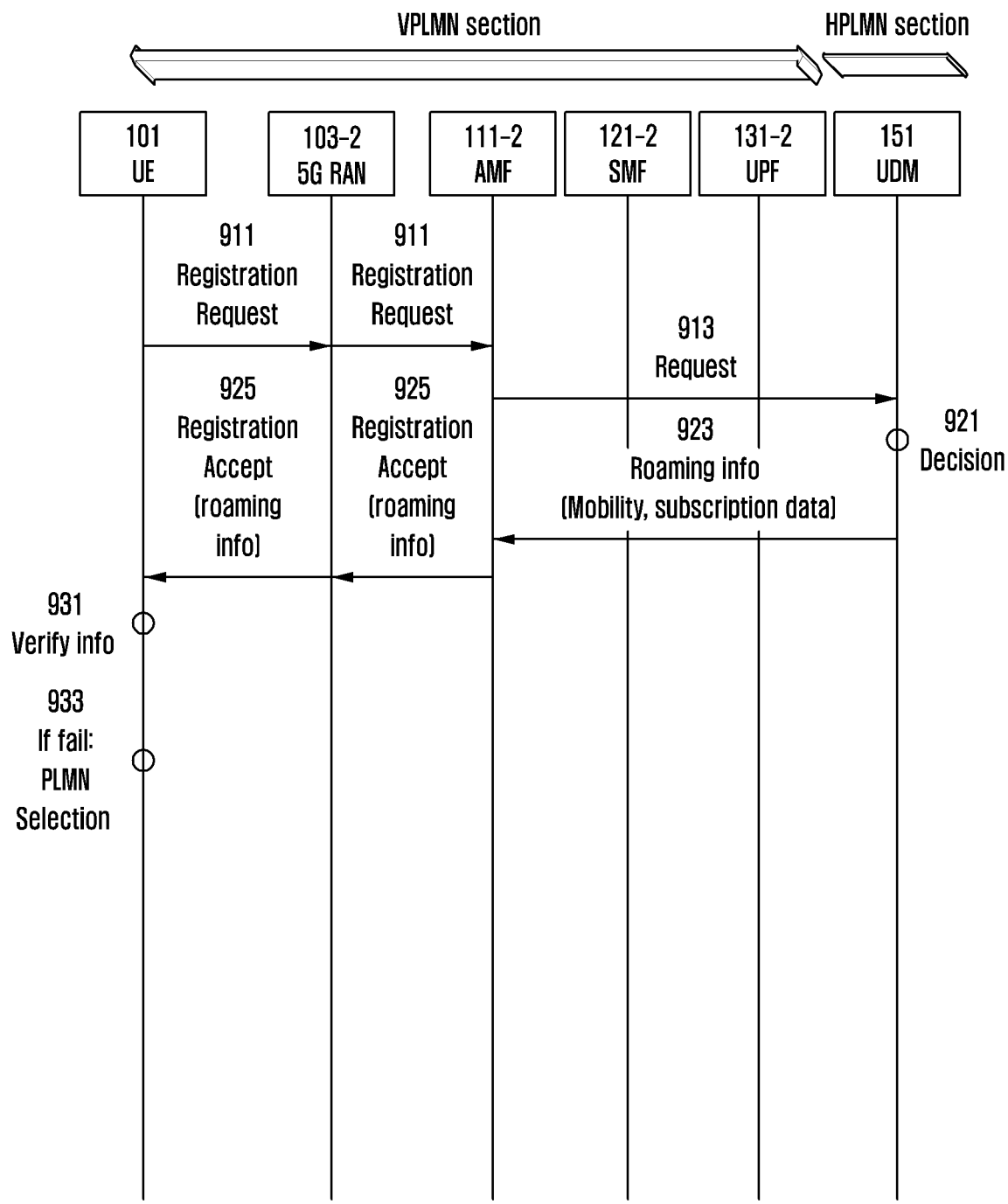
FIG. 9 is a signal flow diagram illustrating roaming and data communication procedures of a UE in a 5G network according to an embodiment.

FIG. 9 is a signal flow diagram illustrating roaming and data communication procedures of a JE in a 5G network according to an embodiment. For example, the procedures of FIG. 9 are described with reference to the network environment of FIG. 1.

More specifically, FIG. 9 illustrates procedures for when security identification on steering of roaming (SoR) information fails during initial registration. When security identification of SoR fails, the UE 101 may perform PLMN selection. Because such PLMN selection is to occur while the UE 101 may not camp on a current cell, the PLMN selection includes newly selecting a PLMN from PLMNs to be accessed by the UE 101, such as a registered PLMN, equivalent PLMN, operator controlled PLMN, and high priority PLMN.

Alternatively, when security identification of SoR fails, the UE 101 may not perform a service request message in an idle state, or the UE 101 may not transmit a PDU session establishment request message or a PDU session modification request message.

Referring to FIG. 9, the UE 101 performs initial registration.

In step 911, the UE 101 transmits a registration request message to the AMF 111-2, through the 5G RAN 103-2 of the VPLMN-A 183.

In order to notify the network that the registration request message is an initial registration request, the UE 101 may set a 5GS registration type information element (IE), i.e., a parameter, to initial registration, and transmit the registration request message.

In in step 913, the AMF 111-2 that received the registration request message from the UE 11 accesses the HPLMN 181 in which the UE 101 is registered and transmits a request message, to the UDM 151 of the HPLMN 181, requesting VPLMN related information and subscription related information of the UE 101.

In step 921, the UDM 151 of the HPLMN 181 determines whether or not to send roaming related information to be transmitted to the UE 101. When the UDM 151 determines to send roaming related information, the UDM 151 may determine which information to send. For example, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 111 or changed subscription information to be provided to an external PLMN from among roaming related information. For example, the UDM 151 may determine information among mobility related information and among subscription information to be transmitted to the AMF 111-2 of the VPLMN-A 183. In FIG. 9, the UDM 151 determines to provide corresponding information to the AMF 111-2 of the VPLMN-A 183.

Information that the UDM 151 transmits to the UE 101 through the AMF 111-2 of the VPLMN-A 183 may include roaming steering information and security information (information such as a security key and security credential) for protecting roaming steering information.

In step 923, the UDM 151 of the HPLMN 181 transmits, to the AMF 111-2 of the VPLMN-A 183, roaming related information such as mobility related information to be sent to the UE 101, changed subscription data information, roaming steering information, security information (information such as a security key and security credential) for protecting roaming steering information, and VPLMN information to be accessed by the UE 101. For example, in order to update VPLMN information that the UE 101 may select in relation to roaming, corresponding information may be transmitted using a NAS message. A VPLMN related PLMN list and access technology information for selecting a PLMN, such as an access technology to which the UE 101 may access, e.g., 4G LTE or 5G, may be transmitted together.

The PLMN list and access technology information may be transmitted through PLMN operator controlled list information.

In step 925, the AMF 111-2 of the VPLMN-A 183 transmits a registration accept message to the UE 101 through the 5G RAN 103-2. Roaming steering information that the AMF 111-2 of the VPLMN-A 183 receives from the UDM 115 of the HPLMN 181, security information (information such as a security key and security credential) for protecting the roaming steering information, and roaming related information may be transmitted to the UE 101 through the registration accept message. Such information may be secured and transmitted, e.g., as security protected information.

In step 931, the UE 101 verifies roaming related information included in the registration accept message received from the AMF 111-2 of the VPLMN-A 183 through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list.

Accordingly, when security verification fails, the UE 101 performs PLMN selection in step 933. When security identification of SoR fails, the UE 101 performs PLMN selection. Because PLMN selection is performed while the UE 101 may not camp on a current cell, the PLMN selection is a process of newly selecting a PLMN from PLMNs to be accessed by the UE 101, such as a registered PLMN, equivalent PLMN, operator controlled PLMN, and high priority PLMN.

Alternatively, when security identification of SoR fails, the UE 101 may not perform a service request in an idle state or the UE 101 may not transmit a PDU session establishment request message or a PDU session modification request message.

Figure 10:
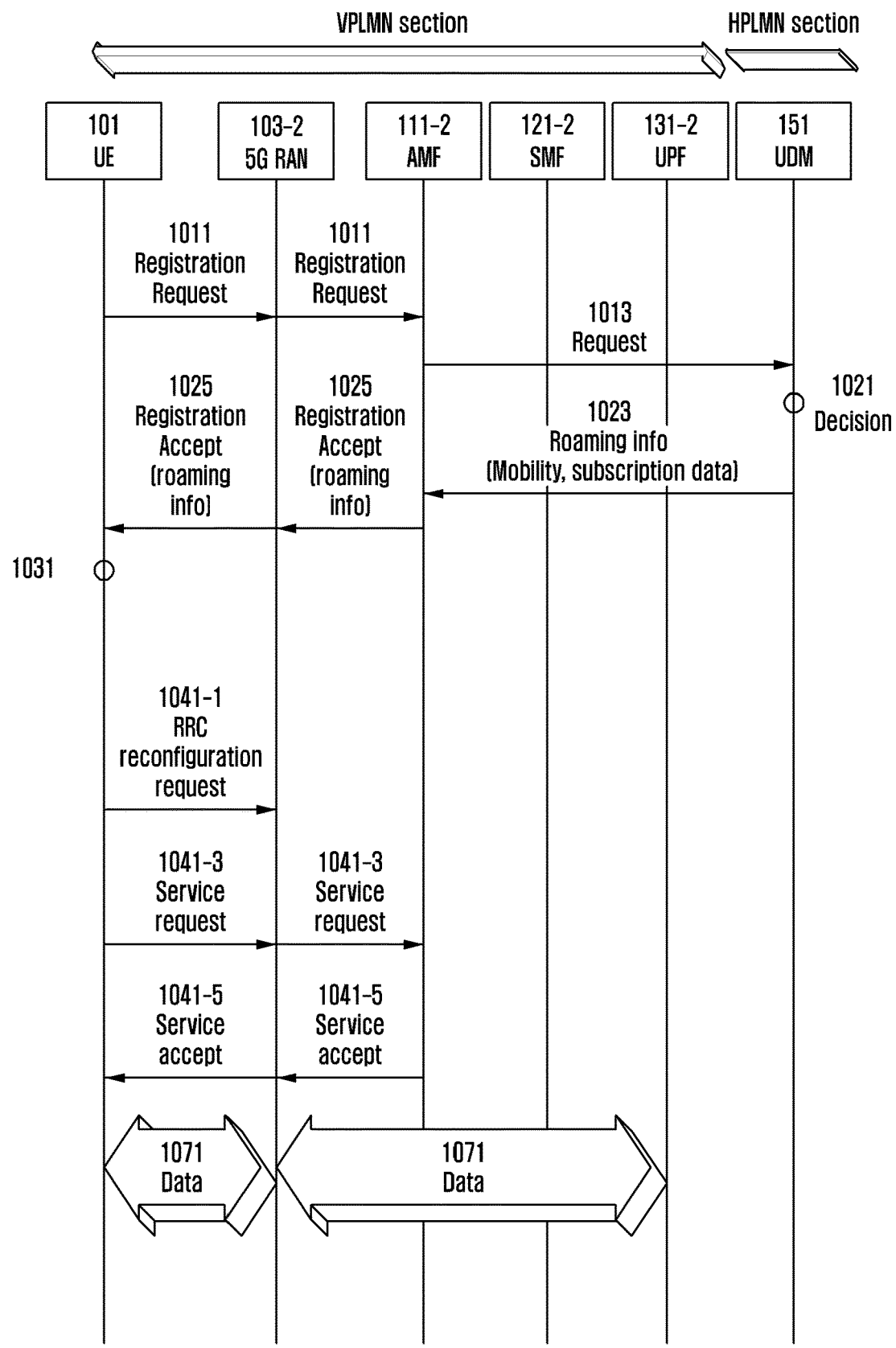
FIG. 10 is a signal flow diagram illustrating roaming and data communication procedures of a UE in a 5G network according to an embodiment.

FIG. 10 is a signal flow diagram illustrating roaming and data communication procedures of a UE in a 5G network according to an embodiment. For example, the procedures of FIG. 10 are described with reference to the network environment of FIG. 1.

More specifically. FIG. 10 illustrates procedures for when a security identification process for SoR information may not be performed during mobility registration.

Referring to FIG. 10, in step 1011, the UE 101 transmits a registration request message to the AMF 111-2 of the VPLMN-A 183, through the 5G RAN 103-2 of the VPLMN-A 183.

In order to notify the network that the registration request message is a mobility registration request, the UE 101 may set the 5GS registration type IE, i.e., a parameter, to mobility registration update and transmit the registration request message.

In step 1013, the AMF 111-2 that has received the registration request message from the UE 111 accesses the HPLMN 181 in which the UE 101 is registered and transmits a request message, to the UDM 151 of the HPLMN 181, requesting VPLMN related information and subscription related information of the UE 101.

In step 1021, the UDM 151 of the HPLMN 181 determines whether or not to send roaming related information to be transmitted to the UE 101. When the UDM 151 determines to send roaming related information, the UDM 151 may determine which information to send. For example, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 111 or changed subscription information to be provided to an external PLMN from among roaming related information. For example, the UDM 151 may determine information among mobility related information and among subscription information to be transmitted to the AMF 111-2 of the VPLMN-A 183. In FIG. 10, the UDM 151 of the HPLMN 181 determines to provide corresponding information to the AMF 111-2 of the VPLMN-A 183.

Information that the UDM 151 of the HPLMN 181 transmits to the UE 101 through the AMF 111-2 of the VPLMN-A 183 may include roaming steering information and security information (information such as a security key and security credential) for protecting roaming steering information.

In step 1023, the UDM 151 of the HPLMN 181 transmits, to the AMF 111-2 of the VPLMN-A 183, roaming related information such as mobility related information to be sent to the UE 101, changed subscription data information, roaming steering information, security information (information such as a security key and security credential) for protecting roaming steering information, and VPLMN information to be accessed by the UE 101. For example, in order to update VPLMN information that the UE 101 may select in relation to roaming, corresponding information may be transmitted using a NAS message. A VPLMN related PLMN list and access technology information for selecting a PLMN, such as an access technology to which the UE 101 may access, e.g., 4G LTE or 5G, may be transmitted together.

The PLMN list and access technology information may be transmitted through PLMN operator controlled list information.

In step 1025, the AMF 111-2 of the VPLMN-A 183 transmits a registration accept message to the UE 101 through the 5G RAN 103-2. Roaming related information that the AMF 111-2 of the VPLMN-A receives from the UDM 115 of the HPLMN 181 may be transmitted to the UE 101 through the registration accept message. Such information may be secured and transmitted. e.g., as security protected information.

In step 1031, the UE 101 performs an operation corresponding to one of the following cases.

Case 1: the UE 101 verifies roaming related information included in the registration accept message received from the AMF 111-2 of the VPLMN-A 183 through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list.

Case 2: if steps 1011-1025 are for mobility registration, a security identification process for SoR information may not be performed in step 1031.

If steps 1011-1025 are for mobility registration and security identification on SoR information is not performed, the connection may not be released or the PDU session may not be released.

Case 2-1: when steps 1011 to 1025 are for mobility registration, and in steps 1031 and 1033, security identification on SoR information should not be performed, the terminal may not release the connection, or the UE 101 may not release the PDU session.

Case 2-2: when steps 1011 to 1025 are for mobility registration, and in steps 1031 and 1033, security identification on SoR information may or may not be performed, the terminal may not release the connection, or the UE does not release the PDU session.

An example is described as follows.

In step 1041-1, the UE 101 transmits an RRC reconfiguration request message to the 5G RAN 103-2 of the VPLMN-A 183. In step 1041-3, the UE 101 transmits a service request message, which is a NAS message, to the AMF 111-2 of the VPLMN-A 183 through the 5G RAN 103-2 of the VPLMN-A 183. Although the service request message in step 1041-3 is shown as a separated message, it may be transmitted to the AMF 111-2 of the VPLMN-A 183 through the 5G RAN 103-2 of the VPLMN-A 183 together with the RRC message in step 1401-1.

In step 1041-5, the AMF 111-2 of the VPLMN-A 183 transmits a service accept message to the UE 101 through the 5G RAN 103-2 of the VPLMN-A 183.

In step 1071, the UE 101 performs data communication with the network. UL data may be transmitted from the UE 101 to the network or data may be transmitted from the UPF 131-2 of the VPLMN-A 183 to the UE 101 through DL.

Figure 11:
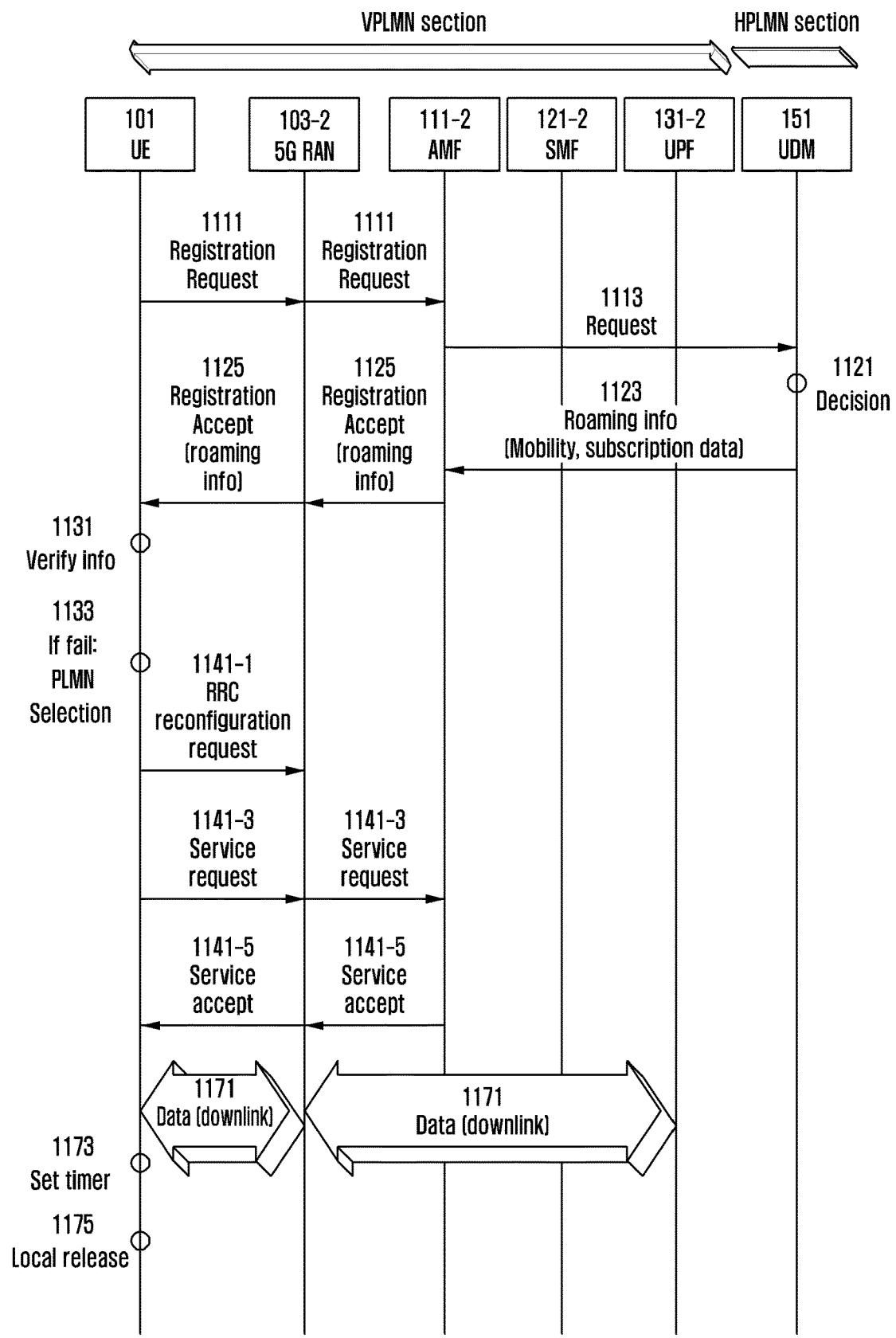
FIG. 11 is a signal flow diagram illustrating roaming and data communication procedures of a UE in a 5G network according to an embodiment.

FIG. 11 is a signal flow diagram illustrating roaming and data communication procedures of a JE in a 5G network according to an embodiment. For example, the procedures of FIG. 11 are described with reference to the network environment of FIG. 1.

More specifically, FIG. 11 illustrates procedures for not releasing a PDU session (or connection) when registration of the UE 101 is mobility registration and security identification on SoR information fails.

Referring to FIG. 11, in step 111, the UE 101 transmits a registration request message to the AMF 111-2 of the VPLMN-A 183, through the 5G RAN 103-2 of the VPLMN-A 183.

In order to notify the network that such a registration request message is a mobility registration request, a 5GS registration type IE, i.e., a parameter, is set to mobility registration update, and the registration request message is transmitted.

In step 1113, the AMF 111-2 that has received the registration request message from the UE 111 accesses the HPLMN 181 in which the UE 101 is registered and transmits a request message, to the UDM 15I of the HPLMN 181, requesting VPLMN related information and subscription related information of the UE 101.

In step 1121, the UDM 151 of the HPLMN 181 determines whether or not to transmit roaming related information to be transmitted to the UE 101. When the UDM 151 determines to send roaming related information, the UDM 151 may determine which information to send. For example, the UDM 151 of the HPLMN 181 may determine whether to transmit mobility related information, subscription related information, etc., in relation to roaming to the UE 101. The subscription related information may include subscription information obtained by extracting only roaming related information from among subscription information that the UDM 151 possesses for the UE 111 or changed subscription information to be provided to an external PLMN from among roaming related information. For example, the UDM 151 may determine information among mobility related information and among subscription information to be transmitted to the AMF 111-2 of the VPLMN-A 183. In FIG. 11, the UDM 151 determines to provide corresponding information to the AMF 111-2 of the VPLMN-A 183.

The information that the UDM 151 of the HPLMN 181 transmits to the JE 101 through the AMF 111-2 of the VPLMN-A 183 may include roaming steering information and security information (information such as a security key and security credential) for protecting roaming steering information.

In step 1123, the UDM 151 of the HPLMN 181 transmits, to the AMF 111-2 of the VPLMN-A 183, roaming related information such as mobility related information to be sent to the UE 101, changed subscription data information, roaming steering information, security information (information such as a security key and security credential) for protecting roaming steering information, and VPLMN information to be accessed by the UE 101. For example, in order to update VPLMN information that the UE 101 may select in relation to roaming, the UDM 151 may transmit corresponding information using a NAS message. A VPLMN related PLMN list and access technology information for use in selecting a PLMN, such as access technology to which the UE 101 may access, e.g., 4G LTE or 5G, may be transmitted together.

The PLMN list and access technology information may be transmitted through PLMN operator controlled list information.

In step 1125, the AMF 111-2 of the VPLMN-A 183 transmits a registration accept message to the UE 101 through the 5G RAN 103-2. The registration accept message may include roaming related information. The roaming related information that the AMF 111-2 of the VPLMN-A 183 receives from the UDM 115 of the HPLMN 181 may be transmitted to the UE 101 through the registration accept message. Such information may be secured and transmitted, e.g., as security protected information.

In step 1131, the UE 101 verifies roaming related information included in the registration accept received from the AMF 111-2 of the VPLMN-A 183 through the 5G RAN 103-2. For example, the UE 101 may identify whether security verification fails and/or succeeds by performing security verification on roaming related information that is security protected. When security verification fails, the UE 101 may store the received PLMN related information as a forbidden PLMN in a forbidden PLMN list.

In this way, when security verification fails, in step 1133, the UE 101 performs PLMN selection. For example, the UE 101 may select a PLMN having a high priority to perform PLMN selection.

Alternatively, the UE 101 may select an operator controlled PLMN to perform PLMN selection, or may not perform PLMN selection.

When steps 1111 to 1125 are for mobility registration and security identification on SoR information fails in steps 1131 and 1133, the UE 101 does not release the PDU session. Alternatively, in the case that steps 1111 to 1125 are mobility registration and that security identification on SoR information fails, the UE 101 may not release the connection.

In an embodiment (case 1-1), the connection is not released or the PDU session is not released. In an embodiment (case 1-1-1), as illustrated in steps 1141-1 to 1171, the connection is not released or the PDU session is not released.

Alternatively, in an embodiment (case 1-1-2), the connection is not released or the PDU session is not released as in step 1171.

As another embodiment (case 1-2), the connection or the PDU session may not be released at first, and then the PDU session may be released later. As an embodiment (case 1-2-1), as illustrated in steps 1141-1 to 1171, the connection may not be released or the PDU session may not be released, and then the PDU session may be released. In an embodiment (case 1-2-2), the connection may not be released or the PDU session may not be released as in step 1171, and then the PDU session may be released Alternatively, in another embodiment (Case 2-3):

As illustrated in steps 1141-1 to 1171, based on a timer such as a backup timer, after the connection is not released or the PDU session is maintained for a certain period of time, the PDU session may be released as in 1173 and 1175, or the PDU session may be released based on a timer such as a backup timer.

In step 1141-1, the UE 101 transmits an RRC reconfiguration request message to the 5G RAN 103-2 of the VPLMN-A 183. In step 1141-3, the UE 101 transmits a service request message, which is a NAS message, to the AMF 111-2 of the VPLMN-A 183 through the 5G RAN 103-2 of the VPLMN-A 183. Although FIG. 11 illustrates the service request message being transmitted separately in step 1141-3, it may be transmitted to the AMF 111-2 of the VPLMN-A 183 through the 5G RAN 103-2 of the VPLMN-A 183 together with the RRC message in step 1141-1.

In response to step 1141-3, as in step 1141-5, the AMF 111-2 of the VPLMN-A 183 transmits a service accept message to UE 101 through the 5G RAN 103-2 of the VPLMN-A 183.

Thereafter, UL data may be transmitted from the UE 101 to the network, or in step 1171, data may be transmitted from the UPF 131-2 of the VPLMN-A 183 to the UE 101, i.e., through a DL.

In step 1173, a timer is set to release the PDU session established with the VPLMN-A 183. The timer may utilize a timer value defined in the standard in relation to the release of the PDU session or may set a new timer value.

In step 1175, if there is a communicating PDU session, the UE 101 may locally release the PDU session. For example, the UE 101 may release a corresponding session after a certain period of time without communication with the network, or when a timer value set by the UE 101 expires, thereby releasing the session established with the VPLMN-A 183.

In the above-described embodiments, some components are expressed in the singular or plural. However, the singular or plural expression is appropriately selected for a situation presented for convenience of description, and the disclosure is not limited to the singular or plural components. For example, even if a component is represented in the plural, it may be composed of the singular, or even if a component is represented in the singular, it may be composed of the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

According to the above-described embodiments of the disclosure, when roaming in a wireless communication system, a terminal can select an operator PLMN for data communication, and in the case that PLMN information to be newly accessed by a terminal is transmitted, a method of processing PLMN information can be provided. Further, the above-described embodiments of the disclosure can provide a method and device for a terminal to verify PLMN information when receiving PLMN information to be newly accessed by a roaming terminal in a wireless communication system, and to perform communication according to the verification result (success/failure).

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a user equipment (UE) in a wireless communication system, the method comprising:
    transmitting, to a first visited public land mobile network (VPLMN), a first registration request message;
    receiving, from the first VPLMN, a registration accept message including first roaming information associated with a home public land mobile network (HPLMN);
    validating the first roaming information;
    transmitting, to the first VPLMN, a service request message for second roaming information, if the first roaming information is not valid;
    receiving, from the first VPLMN, a service accept message including the second roaming information;
    transmitting, to an access and mobility management function (AMF) of the first VPLMN, a notifying message indicating that the first roaming information is not valid based on the result of the validating;
    setting a timer for releasing a protocol data unit (PDU) session with the first VPLMN;
    based on the timer, performing a local release for the PDU session with the first VPLMN;
    based on the second roaming information, selecting a second VPLMN; and
    transmitting, to the second VPLMN, a second registration request message.

2. The method of claim 1, wherein the first roaming information includes at least one of mobility information, modified subscription data information, or VPLMN information to be accessed by the UE.

3. The method of claim 2, wherein the VPLMN information to be accessed by the UE is determined by the HPLMN.

4. A method performed by an access and mobility management function (AMF) associated with a first visited public land mobile network (VPLMN) in a wireless communication system, the method comprising:
    receiving, from a user equipment (UE), a registration request message;
    in response to the registration request message, transmitting, to a home public land mobile network (HPLMN), a request message;
    receiving, from the HPLMN, first roaming information;
    transmitting, to the UE, a registration accept message including the first roaming information;
    receiving, from the UE, a service request message for second roaming information, if the first roaming information is not valid;
    transmitting, to the UE, a service accept message including the second roaming information; and
    receiving, from the UE, a notifying message indicating that the first roaming information is not valid.

5. The method of claim 4, wherein the first roaming information includes at least one of mobility information, modified subscription data information, or VPLMN information to be accessed by the UE.

6. The method of claim 5, wherein the VPLMN information to be accessed by the UE is determined by the HPLMN.

7. The method of claim 4, further comprising transmitting, to a session management function (SMF) of the first VPLMN, the notifying message.

8. A user equipment (UE) in a wireless communication system, the UE comprising:
    a transceiver; and
    a controller configured to:
        transmit, to a first visited public land mobile network (VPLMN), a first registration request message,
        receive, from the first VPLMN, a registration accept message including first roaming information associated with a home public land mobile network (HPLMN),
        validate the first roaming information,
        transmit, to the first VPLMN, a service request message for second roaming information, if the first roaming information is not valid,
        receive, from the first VPLMN, a service accept message including the second roaming information,
        transmit, to an access and mobility management function (AMF) of the first VPLMN, a notifying message indicating that the first roaming information is not valid based on the result of the validating,
        set a timer for releasing a protocol data unit (PDU) session with the first VPLMN,
        based on the timer, perform a local release for the PDU session with the first VPLMN,
        based on the second roaming information, select a second VPLMN, and
        transmit, to the second VPLMN, a second registration request message.

9. The UE of claim 8, wherein the first roaming information includes at least one of mobility information, modified subscription data information, or VPLMN information to be accessed by the UE.

10. The UE of claim 9, wherein the VPLMN information to be accessed by the UE is determined by the HPLMN.

11. An access and mobility management function (AMF) associated with a first visited public land mobile network (VPLMN) in a wireless communication system, the AMF comprising:
    a transceiver; and
    a controller configured to:
        receive, from a user equipment (UE), a registration request message,
        in response to the registration request message, transmit, to a home public land mobile network (HPLMN), a request message,
        receive, from the HPLMN, first roaming information,
        transmit, to the UE, a registration accept message including the first roaming information,
        receive, from the UE, a service request message for second roaming information, if the first roaming information is not valid,
        transmit, to the UE, a service accept message including the second roaming information, and
        receive, from the UE, a notifying message indicating that the first roaming information is not valid.

12. The AMF of claim 11, wherein the first roaming information includes at least one of mobility information, modified subscription data information, or VPLMN information to be accessed by the UE.

13. The AMF of claim 12, wherein the VPLMN information to be accessed by the UE is determined by the HPLMN.

14. The AMF of claim 11, the controller is further configured to transmit, to a session management function (SMF) of the first VPLMN, the notifying message.

* * * * *